United States Patent
Wang et al.

(10) Patent No.: US 12,346,565 B2
(45) Date of Patent: Jul. 1, 2025

(54) PERSISTENT MEMORY BASED CACHING FOR INTELLIGENT NETWORK INTERFACE CARDS

(71) Applicant: Oracle International Corporation, Redwood Shores, CA (US)

(72) Inventors: Qiang Wang, Bellevue, WA (US); Kent Lee, Ladera Ranch, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/318,457

(22) Filed: May 16, 2023

(65) Prior Publication Data

US 2023/0376210 A1   Nov. 23, 2023

Related U.S. Application Data

(63) Continuation-in-part of application No. 17/747,277, filed on May 18, 2022.

(51) Int. Cl.
*G06F 3/06* (2006.01)
*H04L 67/568* (2022.01)

(52) U.S. Cl.
CPC .......... *G06F 3/0613* (2013.01); *G06F 3/0659* (2013.01); *G06F 3/0673* (2013.01); *H04L 67/568* (2022.05)

(58) Field of Classification Search
CPC .... G06F 3/0613; G06F 3/0659; G06F 3/0673; G06F 3/067; H04L 67/568; H04L 67/1097

(Continued)

(56) References Cited

U.S. PATENT DOCUMENTS

| 6,671,256 B1 | 12/2003 | Xiong et al. |
| 9,923,798 B1 | 3/2018 | Bahadur et al. |

(Continued)

FOREIGN PATENT DOCUMENTS

WO   WO-2022057439 A1 *   3/2022   ......... G06F 12/0238

OTHER PUBLICATIONS

"nvm Express", retrieved from https://nvmexpress.org, Jun. 10, 2019 and printed on Sep. 30, 2022, 5 pages.

(Continued)

*Primary Examiner* — Hosain T Alam
*Assistant Examiner* — Zubair Ahmed
(74) *Attorney, Agent, or Firm* — Kilpatrick Townsend & Stockton LLP

(57) ABSTRACT

The disclosed systems, methods, and computer readable media relate to managing persistent memory within a smart network interface card (smartNIC) of a cloud-computing environment, or at storage device of the host instance on which the smartNIC operates and to which the smartNIC has access. The smartNIC may be configured with various modes that enable passthrough of input/output operations to or from non-volatile remote storage (e.g., a block storage data plane volume) or storage of at least some of the data corresponding to the input/output operations within the persistent memory managed by the smartNIC. The smartNIC may be configured to select a storage location for data between a pool of candidate storage including the persistent storage managed by the smartNIC or the non-volatile remote storage. These techniques improve communications between the smartNIC and the non-volatile remote storage and reduce the risk of network jitters and overall network latency.

22 Claims, 18 Drawing Sheets

(58) Field of Classification Search
USPC .................................................. 711/154, 100
See application file for complete search history.

(56) References Cited

U.S. PATENT DOCUMENTS

| | | | |
|---|---|---|---|
| 9,998,394 | B2 | 6/2018 | Agrawal et al. |
| 11,226,773 | B1 | 1/2022 | Patel et al. |
| 11,327,812 | B1 | 5/2022 | Shveidel et al. |
| 2013/0003559 | A1 | 1/2013 | Matthews |
| 2013/0166727 | A1* | 6/2013 | Wright .................. G06F 3/0659 709/224 |
| 2015/0188796 | A1 | 7/2015 | Bugenhagen |
| 2015/0215211 | A1 | 7/2015 | Bhikkaji et al. |
| 2015/0281288 | A1 | 10/2015 | Levinson et al. |
| 2015/0319237 | A1* | 11/2015 | Hussain .................. G06F 3/067 709/217 |
| 2017/0034843 | A1 | 2/2017 | Liu et al. |
| 2017/0324813 | A1* | 11/2017 | Jain ....................... G06F 9/5016 |
| 2018/0287912 | A1 | 10/2018 | Zabarsky et al. |
| 2018/0295042 | A1 | 10/2018 | Koster et al. |
| 2018/0375760 | A1 | 12/2018 | Saavedra |
| 2019/0073141 | A1 | 3/2019 | Brennan et al. |
| 2019/0073162 | A1 | 3/2019 | Karr et al. |
| 2019/0073265 | A1 | 3/2019 | Brennan et al. |
| 2020/0264954 | A1 | 8/2020 | Belgaied et al. |
| 2020/0278892 | A1 | 9/2020 | Nainar et al. |
| 2021/0111998 | A1 | 4/2021 | Saavedra |
| 2021/0409262 | A1 | 12/2021 | Watson et al. |
| 2022/0229787 | A1 | 7/2022 | Veluswamy et al. |
| 2022/0232073 | A1 | 7/2022 | Kuttuva Jeyaram et al. |
| 2022/0329520 | A1 | 10/2022 | DeGrace et al. |
| 2023/0281049 | A1 | 9/2023 | Dong et al. |

OTHER PUBLICATIONS

'SPDK', retrieved from https://spdk.io/, on Sep. 30, 2022, 5 pages.
U.S. Appl. No. 18/318,525, Notice of Allowance mailed on Oct. 10, 2023, 10 pages.
U.S. Appl. No. 17/747,277, Non-Final Office Action, mailed on Apr. 2, 2025, 8 pages.
U.S. Appl. No. 18/520,207, "Non-Final Office Action", mailed on Apr. 10, 2025, 10 pages.
U.S. Appl. No. 18/520,207, "Non- Final Office Action", mailed on Apr. 17, 2025, 23 pages.

* cited by examiner

PERSISTENT MEMORY BASED CACHING FOR INTELLIGENT NETWORK INTERFACE CARDS

CROSS-REFERENCE TO RELATED APPLICATIONS

This application is a continuation-in-part of U.S. Non-Provisional patent application Ser. No. 17/747,277, filed on May 18, 2022, entitled "A Single Hop Approach for Distributed Block Storage via a Network Virtualization Device," the disclosure of which is herein incorporated by reference in its entirety for all purposes.

BACKGROUND

Creating and running a cloud service can include connecting persistent storage (e.g., a block storage data plane (BSDP) component) to host instances (bare metal (BM) instances, virtual machine (VM) instances) via connections made by a smartNIC of the host instance. The data provided via these connections can conform to a non-volatile memory express (NVMe) protocol. When block input/output operations are processed through an NVMe block storage attachment, the data will be transported through multiple network hops, including the smartNIC and the NVMe target (e.g., an endpoint of the BSDP component). Each network hop adds additional time to the end-to-end latency of the data transmission. In addition, packet drops or delay along the network path can introduce extra latency for impacted input/output operations. These issues may manifest as latency jitters from the perspective of the users of the host instances and may cause a sub-optimal user experience.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

At least one embodiment includes a method. The method may comprise managing, by a software agent executing at a smart network interface card configured at a host machine of a cloud computing environment, a persistent storage at the host machine that is accessible to the software agent at the smart network interface card. In some embodiments, the persistent storage at the host machine may be configured to store or provide data by request of the smart network interface card. The method may comprise receiving, by the software agent executing at the smart network interface card from the host machine, a data request being associated with an input/output operation comprising a read operation or a write operation. The method may comprise, responsive to identifying that the data request comprises the read operation or the write operation, determining, by the software agent executing at the smart network interface card, that the persistent storage at the host machine is to be utilized to fulfill the data request. The method may comprise executing, by the software agent executing at the smart network interface card, one or more operations to cause the persistent storage to be utilized to fulfill the data request.

In some embodiments, the software agent executing at the smart network interface card executes as part of a non-volatile memory express (NVMe) controller of the smart network interface card. The NVMe controller may be configured to utilize a NVMe protocol to process requests for accessing non-volatile remote storage accessible to the smart network interface card by a Peripheral Component Interconnect Express (PCIe) bus.

In some embodiments, determining that the persistent storage at the host machine is to be utilized to fulfill the data request comprises selecting the persistent storage from a pool of candidate storage comprising the persistent storage and the non-volatile remote storage, the non-volatile remote storage being hosted by a remote server.

In some embodiments, the persistent storage at the host machine and accessible to the software agent executing at the smart network interface card is a local storage device of the host machine. In some embodiments, the persistent storage at the host machine and accessible to the software agent executing at the smart network interface card is local to the smart network interface card.

In some embodiments, the persistent storage at the host machine and accessible to the software agent executing at the smart network interface card is configured to process over a threshold number of input/output operations per second.

In some embodiments, the method comprises receiving, by the software agent executing at the smart network interface card from a storage control plane of the cloud computing environment, configuration parameters that indicate one or more policies for utilizing the persistent storage at the host machine and accessible to the software agent at the smart network interface card. In some embodiments, determining that the persistent storage at the host machine is to be utilized to fulfill the data request is identified based at least in part on the configuration parameters.

In some embodiments, the one or more policies indicate a particular combination of input/output operations for which the persistent storage at the host machine is to be utilized by the software agent executing at the smart network interface card.

In some embodiments, the configuration parameters comprise a mode indicator indicating one of: a first mode corresponding to utilizing the persistent storage at the host machine for both read operations and write operations, a second mode indicating that the persistent storage at the host machine is not to be used for either the read operations or the write operations, or a third mode indicating that the persistent storage at the host machine is to be used for the write operations.

Some embodiments include a system comprising memory configured to store instructions and one or more processors configured to execute the instructions to cause operations to be performed (e.g., by a software agent executing at a smart network interface card configured at a host machine of a cloud computing environment). The operations may comprise managing a persistent storage at the host machine that is accessible to the software agent at the smart network interface card. In some embodiments, the persistent storage may be configured to store or provide data by request of the smart network interface card. The operations may comprise receiving (e.g., by the software agent executing at the smart network interface card), from the host machine, a data request being associated with an input/output operation comprising a read operation or a write operation. The operations may comprise responsive to identifying that the data request comprises the input/output operation, determining (e.g., by the software agent executing at the smart network interface card) that the persistent storage at the host machine is to be utilized to fulfill the data request. The operations may comprise executing (e.g., by the software agent executing at the smart network interface card) one or more operations to cause the persistent storage to be utilized to fulfill the data request.

In some embodiments, the input/output operation comprises the read operation and executing the one or more operations between the software agent executing at the smart network interface card and the persistent storage that is accessible to the software agent to fulfill the data request causes the system to perform any suitable combination of: 1) determining, by the software agent executing at the smart network interface card and based at least in part on the data request, that a data payload corresponding to the read operation is stored in the persistent storage that is accessible to the software agent, 2) obtaining, by the software agent executing at the smart network interface card from the persistent storage that is accessible to the software agent, the data payload corresponding to the read operation, and/or 3) providing, by the software agent executing at the smart network interface card, the data payload obtained from the persistent storage in response to the data request.

In some embodiments, the input/output operation comprises the read operation and executing the one or more operations between the software agent executing at the smart network interface card and the persistent storage to fulfill the data request causes the system to perform any suitable combination of: 1) determining, by the software agent executing at the smart network interface card and based at least in part on the data request, that the persistent storage is lacking the data payload corresponding to the read operation of the data request, 2) requesting, by the software agent executing at the smart network interface card from non-volatile remote storage, the data payload corresponding to the read operation, 3) receiving, by the software agent executing at the smart network interface card, the data payload corresponding to the read operation, and/or 4) providing, by the software agent executing at the smart network interface card, the data payload obtained from the non-volatile remote storage in response to the data request.

In some embodiments, executing the instructions further causes the system to store in the persistent storage, by the software agent executing at the smart network interface card. In some embodiments, the data payload corresponds to the read operation and received from the non-volatile remote storage.

In some embodiments, executing the instructions further causes the system to perform any suitable combination of: 1) receiving, by the software agent executing at the smart network interface card, a second data request for the data payload, 2) determining, by the software agent executing at the smart network interface card and based at least in part on the second data request, that the data payload is stored in the persistent storage that is accessible to the software agent, and/or 3) obtaining, by the software agent executing at the smart network interface card, the data payload from the persistent storage.

In some embodiments, the input/output operation comprises the write operation and executing the one or more operations between the software agent and the persistent storage to fulfill the data request causes the system to perform any suitable combination of: 1) determining, by the software agent executing at the smart network interface card and based at least in part on the data request, a location in the persistent storage that is accessible to the software agent at which a data payload of the data request is to be stored, and/or 2) in response to the data request, storing, by the software agent executing at the smart network interface card, the data payload of the data request at the persistent storage that is accessible to the software agent.

In some embodiments, the persistent storage that is accessible to the software agent executing at the smart network interface card is associated with a protocol set for moving previously stored data from the persistent storage to non-volatile remote storage.

In some embodiments, A non-transitory computer-readable medium is provided. The non-transitory computer-readable medium may comprise executable instructions that, when executed by one or more processors of a smart network interface card executing at a host machine of a cloud computing environment, causes the one or more processors of the smart network interface card to perform operations. The operations may comprise managing a persistent storage at the host machine that is accessible to the one or more processors of the smart network interface card, the persistent storage being configured to store or provide data by request of the smart network interface card. The operations may comprise receiving, from the host machine, a data request being associated with an input/output operation comprising a read operation or a write operation. The operations may comprise, responsive to identifying that the data request comprises the input/output operation, determining that the persistent storage at the host machine is to be utilized to fulfill the data request. The operations may comprise executing one or more operations to cause the persistent storage to be utilized to fulfill the data request.

In some embodiments, executing the executable instructions further causes the one or more processors of the smart network interface card to perform any suitable combination of: 1) receiving one or more configuration parameters that indicate at least a threshold that, when reached, causes data stored at the persistent storage to be written to a non-volatile remote storage and removed from the persistent storage, and/or 2) executing additional operations to cause the data stored at the persistent storage to be written to the non-volatile remote storage and removed from the persistent storage according to the threshold.

In some embodiments, the data written to the persistent storage is associated with a size that corresponds to the threshold.

In some embodiments, the smart network interface card is configured to process received data according to non-volatile memory express protocol.

In some embodiments, the data request comprises the write operation and executing the executable instructions further causes the one or more processors of the smart network interface card to perform any suitable combination of writing a data payload of the data request to the persistent storage at the host machine that is accessible to the smart network interface card, determining that a time period has elapsed, transmitting the data payload to non-volatile remote storage for storage, and/or removing the data payload from the persistent storage at the host machine that is accessible to the smart network interface card.

In some embodiments, the persistent storage that is accessible to the smart network interface card comprises at least one of: non-volatile random-access memory of the smart network interface card or a solid-state drive attached to the host machine. In some embodiments, the persistent storage that is accessible to the is dedicated to storing data associated with one or more input/output operations received from the host machine.

DETAILED DESCRIPTION

Figure 1:
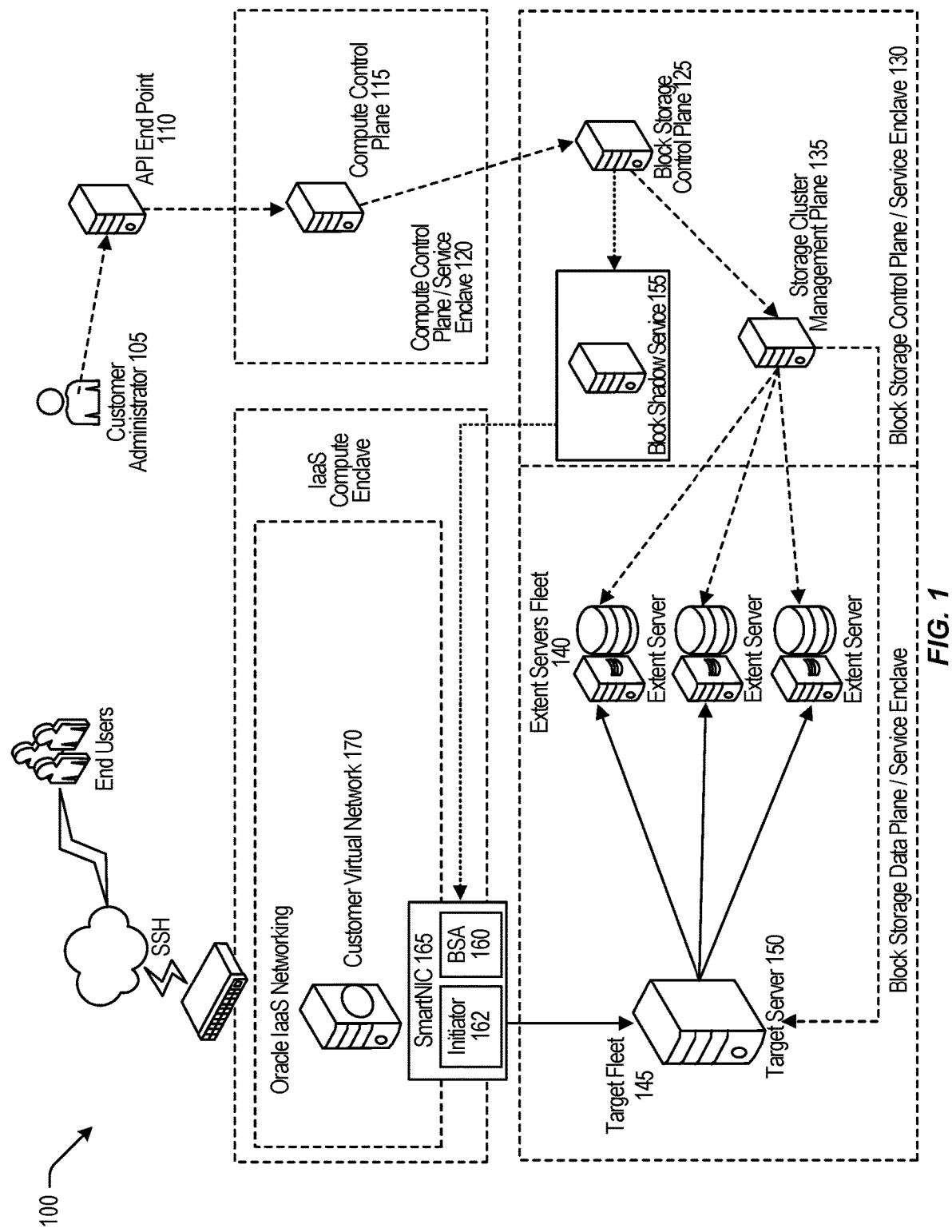
FIG. 1 is a simplified control path diagram showing cloud infrastructure components for attaching Block Storage Data Plane (BSDP) persistent storage, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to managing persistent memory (e.g., non-volatile random-access memory (NVRAM) or a solid-state drive (SSD) of a host machine) by a smart network interface card (smartNIC) operating at the host machine of a cloud computing environment. The persistent memory can be memory of the smartNIC or memory of the host machine on which the smartNIC executes that is accessible and managed by the smartNIC. This persistent memory can be utilized by the smartNIC to store input/output read and/or write operations received from an application running in a virtual machine (VM) or bare-metal (BM) instance of the host machine. The smartNIC may process data formatted according to an NVMe protocol and store the data locally or at non-volatile block storage at a NVMe target (e.g., a remote server such as a block storage data plane server of a block storage data plane of the cloud computing environment). As described above, conventionally, when a block read or write operation traversed through a NVMe block storage attachment, it would be transported through multiple network hops, including the smartNIC and the NVMe target, eventually reaching the block storage backend server. Each network hop adds time to end-to-end latency. In addition, packet drops or delay along the network path could introduce extra latency for impacted input/output operations, which may manifest as latency jitters to the application at the VM/BM.

By enhancing the smartNIC with a persistent memory (e.g., NVRAM) or by using a PCIe-based local SSD of the host machine that is accessible to the smartNIC, latency and jitters may be improved by introducing a local persistent caching layer. With this layer of functionality, block reads can return directly from the persistent storage managed by the smartNIC if they have previously been cached (e.g., due to a previously executed read). Block writes can be returned once committed to the persistent memory storage. The latency associated with the described techniques would be significantly lower than the operations executed to store and/or retrieve from the remote block storage backend in the conventional manner. Meanwhile, packet drop or delay related latency jitters may be eliminated for these input/output operations since a network path is not involved at this stage.

Block writes that have been cached at the persistent storage may be subsequently written to the block storage volume in the cloud. The protocol for purging the persistent memory of block writes may be configurable from the cloud-computing environment (e.g., by a block storage control plane) to enable greater flexibility with controlling the communications between the smartNIC and the non-volatile block storage device (e.g., a block storage data plane server). Communications with the non-volatile block storage device are improved by condensing communications and enable configurability and control of the timing and protocols to be followed. As a result of this configurability and control, block writes between the smartNIC and non-volatile block storage device may be reserved and performed during times when network traffic is not peaking. Additionally, overall network traffic to and from the block storage data plane may be reduced, at least for a time, due to caching input/output operations at the smartNIC. The caching features of the smartNIC may be activated or deactivated by the block storage control plane (e.g., via a user interface provided by the block storage control plane) at run time to enable the latency reducing features and reduced network traffic advantages of the smartNIC to be engaged or disengaged, as desired. These techniques provide greater flexibility with respect to managing network traffic, latency, and jitters conventionally experienced when using cloud-based block storage.

Non-Volatile Memory Express (NVMe) System Background

Creating and running a cloud service can include mounting and connecting persistent storage (e.g., a block storage data plane (BSDP) component) to cloud instances. The persistent storage can be created, using a console or application programming interface (API), and linked to cloud instances (e.g., a virtual machine (VM) host or a bare metal (BM) host machine running in the cloud). Linking, or attaching, persistent storage of a block storage data plane to a cloud instance can be performed using a communication protocol. The attached storage can communicate with the cloud instance's guest operating system (OS) using the protocol.

Connections between a cloud instance and persistent storage within the block storage data plane ("BSDP persistent storage," for brevity) are flexible and a number of configurations are possible. For instance, the BSDP persistent storage can be attached to one or more cloud instances simultaneously. The data in the BSDP persistent storage is durable and the storage can retain data after an attachment to a cloud instance is removed. Data can be migrated between instances by detaching BSDP persistent storage from one cloud instance and attaching the BSDP persistent storage to a second instance.

Durable BSDP persistent storage can allow for instance scaling. A cloud instance can be deleted without destroying or reformatting the corresponding BSDP persistent storage. After the cloud instance is deleted, the BSDP persistent storage can be attached to a new instance. The new instance can be created with a different instance type or shape. For example, the new cloud instance can be a VM or a BM regardless of the deleted instance's type. Additionally, the number of cores in a cloud instance can be changed by deleting an initial instance and creating a new instance with a different number of cores.

A transfer of data through an attachment can be started with an endpoint called an initiator. Data can be sent from the initiator to an endpoint of the BSDP persistent storage that can receive data. This endpoint is referred to as "a target." An agent can set up the target to receive data and forward the data to the target. A number of advantages can be provided by locating the initiator in a smart network interface card (smartNIC). A user may need to provide login information or other configuration from the cloud instance if the initiator is located in the instance. Additionally, it can be difficult to keep the initiator functional across different guest OS types and OS versions. Locating the initiator in the smartNIC can also free customer resources that would be used to run the initiator.

Attachments can be provided using storage networking standards including Internet Small Computer Systems Interface (iSCSI), paravirtualized (PV) iSCSI, and Non-Volatile Memory Express (NVMe). iSCSI can provide attachments for bare metal (BM) devices with the initiator running from inside a customer instance. The initiator for PV iSCSI attachments can be set up and run inside a cloud instance's hypervisor, and PV iSCSI attachments can be limited to running on virtual machines (VM). The initiator for NVMe attachments can be run on a smartNIC. Accordingly, NVMe attachments can provide attachments for both VM and BM networks.

FIG. 1 is a simplified control path diagram 100 showing cloud infrastructure components for attaching BSDP persistent storage, according to an embodiment, for example, using NVMe. A customer administrator 105 can submit a request for a new storage attachment at an application programming interface (API) endpoint 110. In some examples, the customer administrator 105 may be any entity that manages or otherwise administers the use of cloud instances for a customer of the cloud service. In some instances, the API endpoint 110 may be an interface where customer's (e.g., customer administrator 105) can access the cloud service resources, for example, by making requests to have operations performed by the cloud service on resources managed for the customer. The request can be forwarded to the compute control plane 115 in a compute control plane service enclave 120. In some instances, compute control plane 115 can be a series of APIs that can provision, manage, reconfigure, or terminate resources based on user requests. The request can be forwarded from compute control plane 115 to the block storage control plane 125 in the block storage control plane 130. In some examples, the block storage control plane 125 can be a series of APIs that can provision, manage, reconfigure, or terminate block storage.

A request that is received at block storage control plane 125 can be forwarded to the storage cluster management plane 135. Storage cluster management plane 135 can manage server fleets, and, for example, storage cluster management plane 135 can manage extent server fleet 140 and target server fleet 145. In some examples, storage cluster management plane 135 can configure and monitor extent servers fleet 140 or target server fleet 145, and extent server fleet 140 can include servers storing striped and encrypted customer data. Extent server fleet 140 may be an example of BSDP persistent storage. Volumes can be striped across multiple extent servers in extent server fleet 140. Extent servers can be part of a block storage data plane service that handles extent-level I/O and stores the data for replication. In response to the request, storage cluster management plane 135 can identify at least one target server 150 in the target server fleet 145 as a target server for the attachment (e.g., a target server to which initiator 162 is to connect). In some instances, target server 150 can be a server that manages the flow of customer data to and from extent server fleet 140. Target server 150 can accept I/O requests from an NVMe initiator (e.g., initiator 762) operating at smartNIC 165 and send the requests to extent server fleet 140. The storage cluster management plane 135 can select the target server 150 based at least in part on the load experienced by the servers in the target server fleet 145, or the expected volume for the attachment. Storage cluster management plane 135 can forward information about the new attachment to the selected target server 150 or the extent server fleet 140. The information can identify one or more target servers that are able to receive traffic from the new attachment.

The request can be forwarded from block storage control plane 125 to the block shadow service 155. The block shadow service 155 can act as an agent, and block shadow service 155 can communicate with the Block SmartNIC Agent (BSA) 160 in smartNIC 165. In some examples, smartNIC 165 can be hardware that can connect the customer virtual network 170 to other computer networks. BSA 160 can serve as a communication link between block shadow service 155 and an NVMe agent in smartNIC 165. Communication from the block shadow service 155 can provide information about the target server and the attachment to BSA 160. A connection between the customer virtual network 170 and target server fleet 145 can be established by BSA 160. BSA 160 can expose a namespace to the host through host PCIe connection, which can be accessed by the host applications and by the customer through the customer virtual network 170. The customer virtual network 170 can be set up by the VCN, and traffic from customer virtual network 170 can reach extent servers fleet 140 via target server fleet 145 through smartNIC 165.

Figure 2:
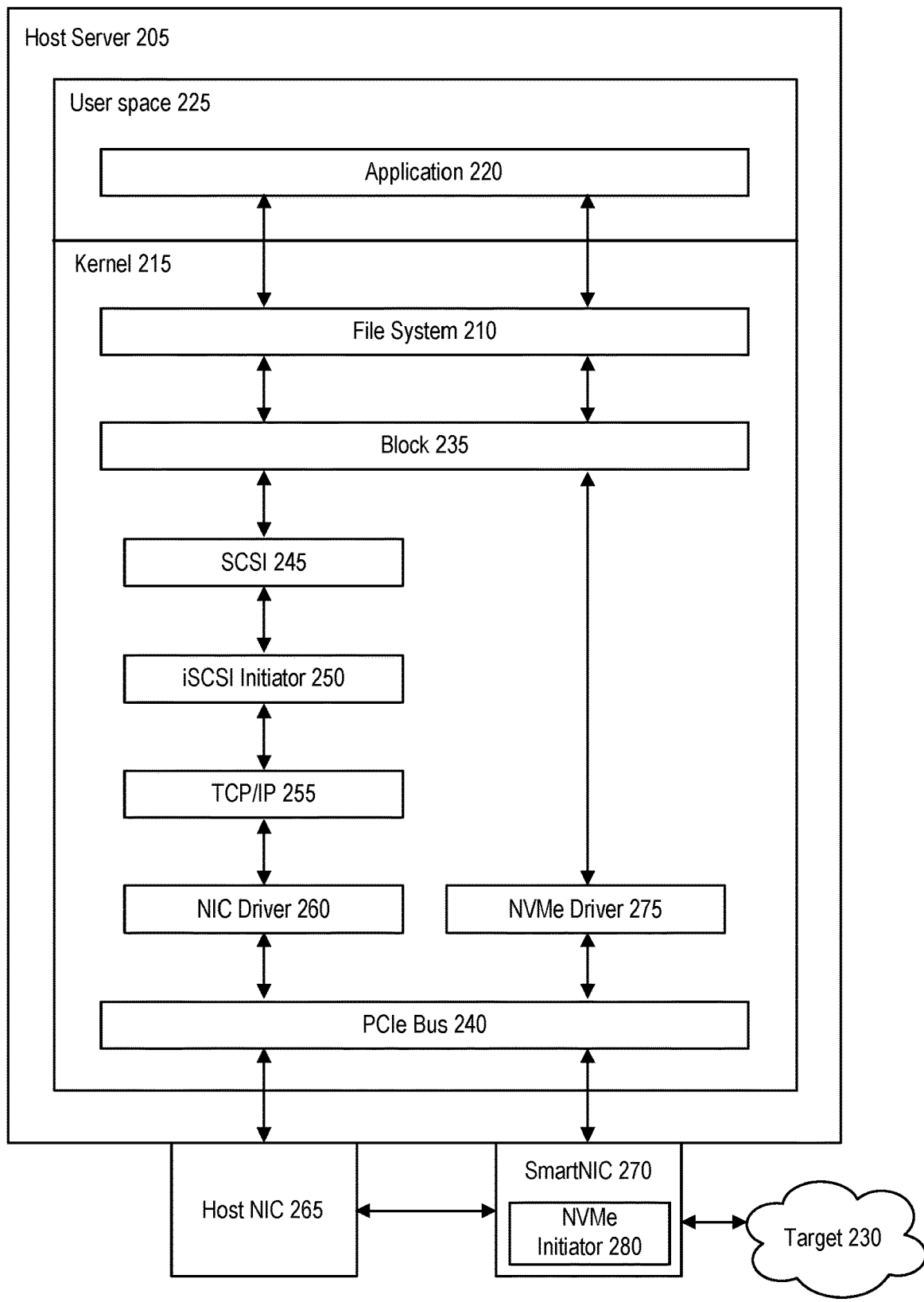
FIG. 2 is a diagram showing a kernel architecture for implementing Internet Small Computer Systems Interface (iSCSI) and Non-Volatile Memory Express (NVMe) attachments, according to an embodiment.

FIG. 2 is a diagram 200 showing a kernel architecture for implementing Internet Small Computer Systems Interface (iSCSI) and Non-Volatile Memory Express (NVMe) attachments according to an embodiment. NVMe and iSCSI are networking protocols providing block-level storage access, and both NVMe and iSCSI can be used to attach BSDP persistent storage. One difference between the two standards is that, in an iSCSI architecture, Input/Output (I/O) requests reach a smartNIC via a host network interface card (NIC), and, in an NVMe architecture, the smartNIC is directly connected to a Peripheral Component Interconnect Express (PCIe) bus. The NVMe kernel stack can be streamlined compared to the iSCSI stack, and NVMe's simplified architecture can be achieved because the NVMe initiator (e.g., initiator 162 of FIG. 1) can be located in the smartNIC 270.

In a host server 205, using either networking protocol, traffic can reach a file system 210 in the kernel 215 from an application 220 in the user space 225. The traffic can be addressed to a target 230 that can be a block storage server (e.g., target server fleet 145, extent servers fleet 140, etc.). Traffic for the two standards can follow similar pathways until the traffic arrives at block 235 from file system 210.

Using iSCSI, traffic from block 235 reaches the PCIe bus 240 via SCSI 245, iSCSI initiator 250, TCP/IP 255, and the NIC driver 260. iSCSI traffic leaving PCIe bus 240 can reach the target via host NIC 265 and smartNIC 270. In some instances, PCIe bus 240 can be a serial computer expansion bus. The NVMe pathway can follow a different pathway, and NVMe traffic can reach PCIe bus 240 from block 235 via NVMe driver 275. Instead of passing through host NIC 265, NVMe traffic can travel from PCIe bus 240 to smartNIC 270 before reaching target 230. The NVMe initiator 280 can be located in smartNIC 270 instead of being located in kernel 215 like iSCSI initiator 250.

Figure 3:
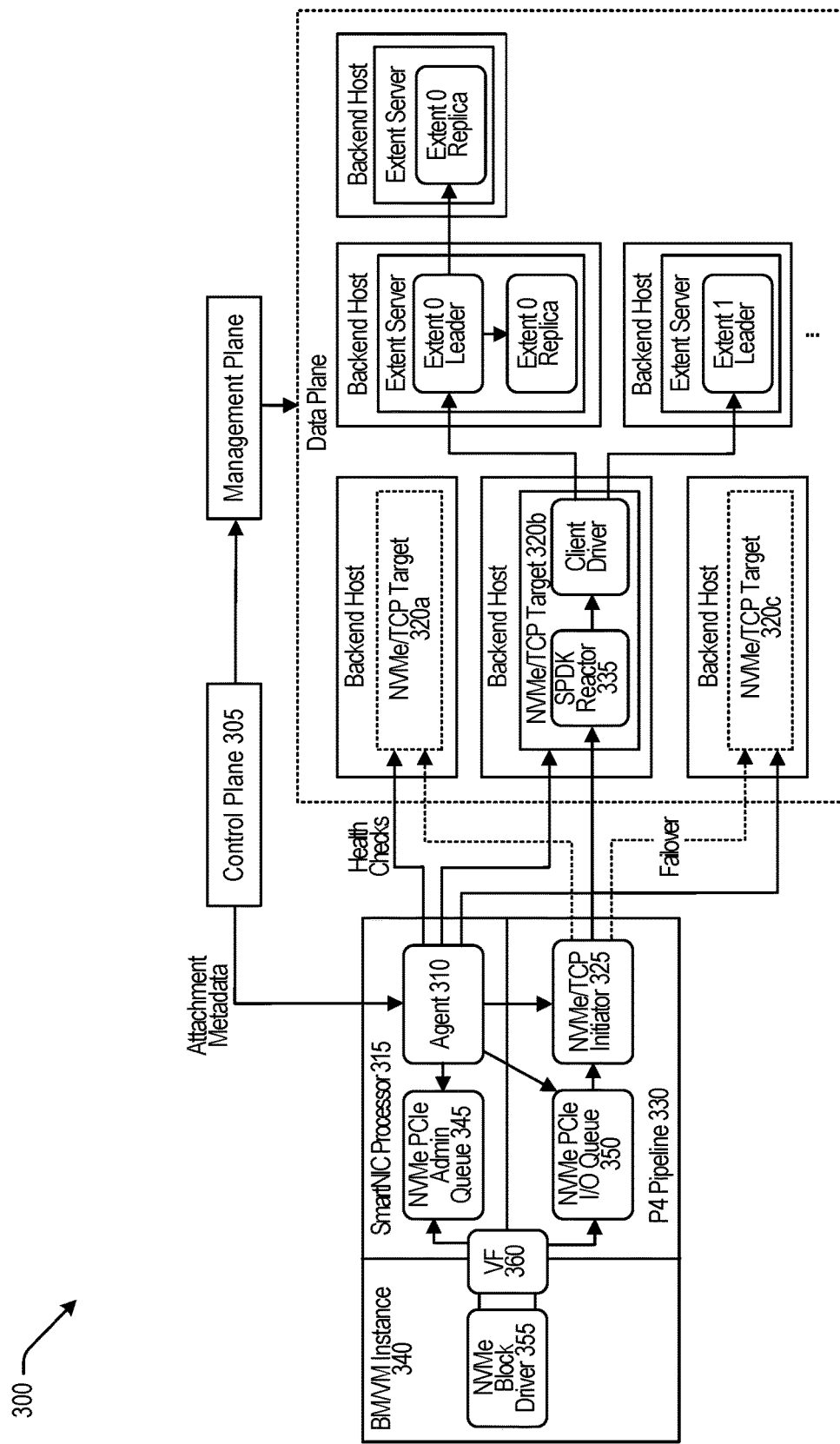
FIG. 3 is a Non-Volatile Memory Express (NVMe) system diagram, according to an embodiment.

FIG. 3 is a Non-Volatile Memory Express (NVMe) system diagram 300 according to an embodiment. A customer, such as customer administrator 105, can initiate an NVMe attachment request from the console or a public API (e.g., API endpoint 110). The NVMe attachment request can be forwarded from the control plane 305 (e.g., block storage control plane 125) to an agent 310 (e.g., BSA 160) in the smartNIC processor 315. The agent 310 can perform health checks on NVMe/TCP targets 320a-320c to identify healthy targets, and agent 310 can instruct the NVMe/TCP initiator 325 in the Programming Protocol-Independent Packet Processors (P4) pipeline 330 to establish a connection with a healthy NVMe/TCP target (e.g., NVMe/TCP target 320b). P4 is a domain-specific programming language that is optimized for controlling packet forwarding. NVMe/TCP initiator 325 can communicate with Storage Performance Development Kit (SPDK) reactor 335 to initiate the connection (e.g., a NVMe/TCP connection). An NVMe/TCP connection refers to a TCP connection with which data provided according to an NVMe protocol that is wrapped/bound to a TCP message-based fabric.

Once a connection is established with NVMe/TCP target 320b and the NVMe attachment is completed, virtual machine/bare metal (VM/BM) instance 340 can issue NVMe admin commands or NVMe I/O commands to the NVMe/TCP target 320b. The NVMe commands can be issued from VM/BM instance 340 to NVMe PCIe admin queue 345 or NVMe PCIe I/O queue 350 via NVMe block driver 355 and virtual function (VF) 360. In some examples, VF 360 can be a PCIe function that supports single root I/O visualization (SR-IOV). In some instances, the admin queue can be used to establish host-controller associations and the queue can support commands like Identify, Get/Set Features, etc. Agent 310 can retrieve NVMe admin commands from the NVMe PCIe admin queue 345 and forward those commands to NVMe/TCP target 320b via a TCP connection using an NVMe specification that maps an NVMe storage access and transport protocol to message-based fabrics using TCP, or the commands can be processed locally. I/O commands received from VM/BM instance 340 can be enqueued into NVMe PCIe I/O queue 350. NVMe block driver 355 (e.g., NVMe driver 275) can retrieve the enqueued commands from NVMe PCIe I/O queue 350 to NVMe/TCP target 320b via NVMe/TCP initiator 325.

Figure 4:
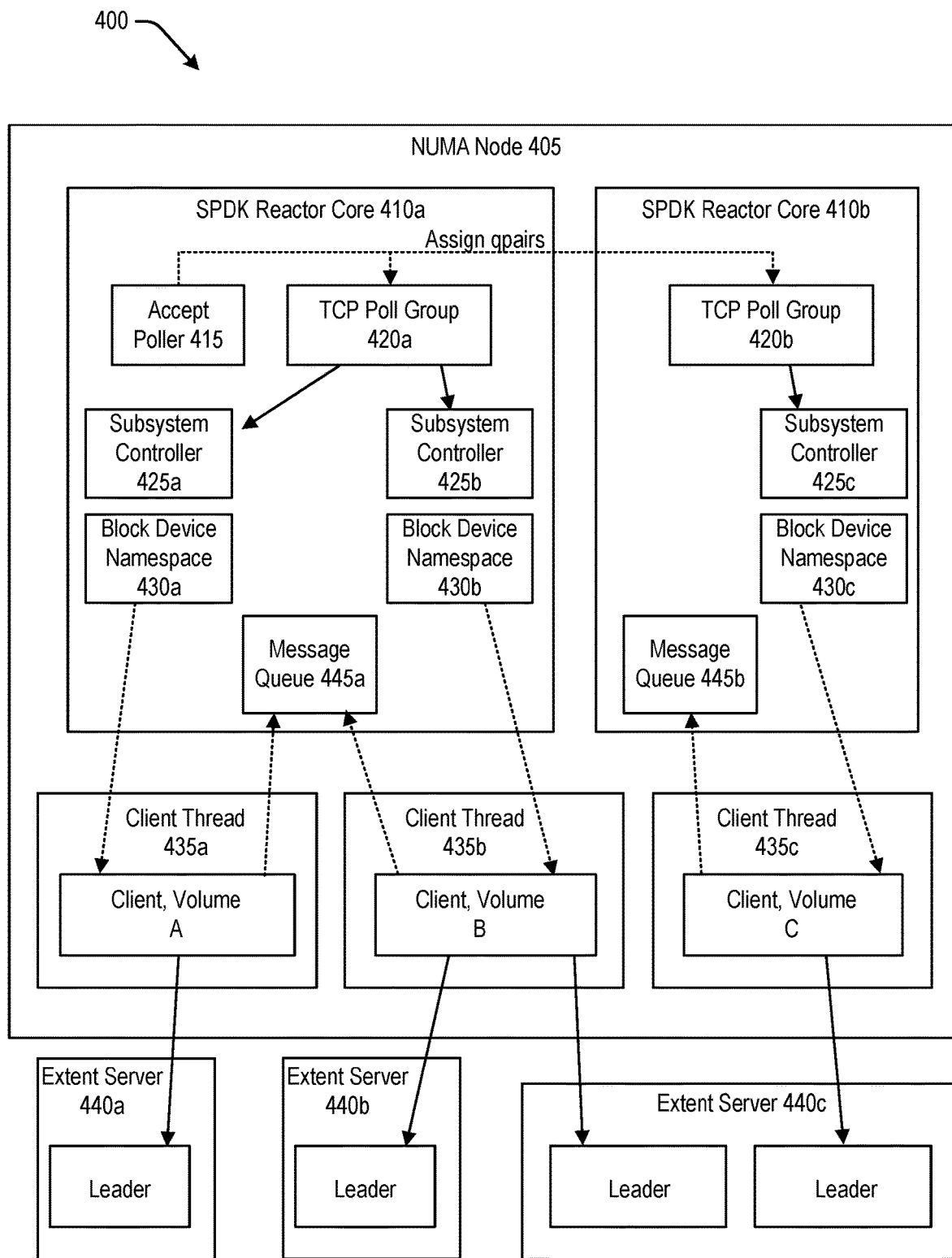
FIG. 4 is a diagram of a Non-Volatile Memory Express (NVMe)/Transmission control Protocol (TCP) target, according to an embodiment.

FIG. 4 is a diagram 400 of a Non-Volatile Memory Express (NVMe)/Transmission Control Protocol (TCP) target according to an embodiment. The NVMe/TCP target (e.g., NVMe/TCP target 320b) can be a Non-Uniform Memory Access (NUMA) node 405 that can include a central processing unit coupled with memory. Cores in the NUMA node 405 CPU can be assigned to one or more SPDK reactor cores such as SPDK reactor cores 410a-410b (e.g., SPDK reactor 335). Accept poller 415 can accept new connections to the SPDK reactor and assign the new connections to a SPDK reactor core (e.g., SPDK reactor core 410a). Accept Poller 415 can assign new connections to an available TCP poll group 420a-b in an available SPDK reactor core 410a-410b, and the new connections can be assigned using a round robin algorithm.

Subsystem controllers 425a-c can be assigned to a new connection, and, for example, subsystem controller 425a can be assigned for a connection made with TCP poll group 420a. More than one subsystem controller 425a-c can be assigned to one of the TCP poll groups 420a-b, and, for instance, subsystem controller 425a and subsystem controller 425b can be assigned to TCP poll group 420a. Block device namespaces 430a-430c can be generated when a connection is made with one of the subsystem controllers 425a-c.

Threads in a NUMA node CPU can be assigned as client threads 435a-c by one of the block device namespaces. Block device namespaces 430a-430c can forward a request that is received through the new connection to one of the client threads 435a-c, and client threads 435a-c can decide which extent server 440a-440c should receive the data associated with the request. After completing the request, client threads 435a-c can send a response to message queue 445a-b to indicate that a request has been completed. Requests can be received at a SPDK reactor core 410a-410b from the smartNIC initiator (e.g., NVMe/TCP initiator 325, NVMe initiator 280, initiator 162, etc.) or a different initiator. Responses can be sent from one of the SPDK reactor cores 410a-410b to the smartNIC initiator or a different initiator.

Figure 5:
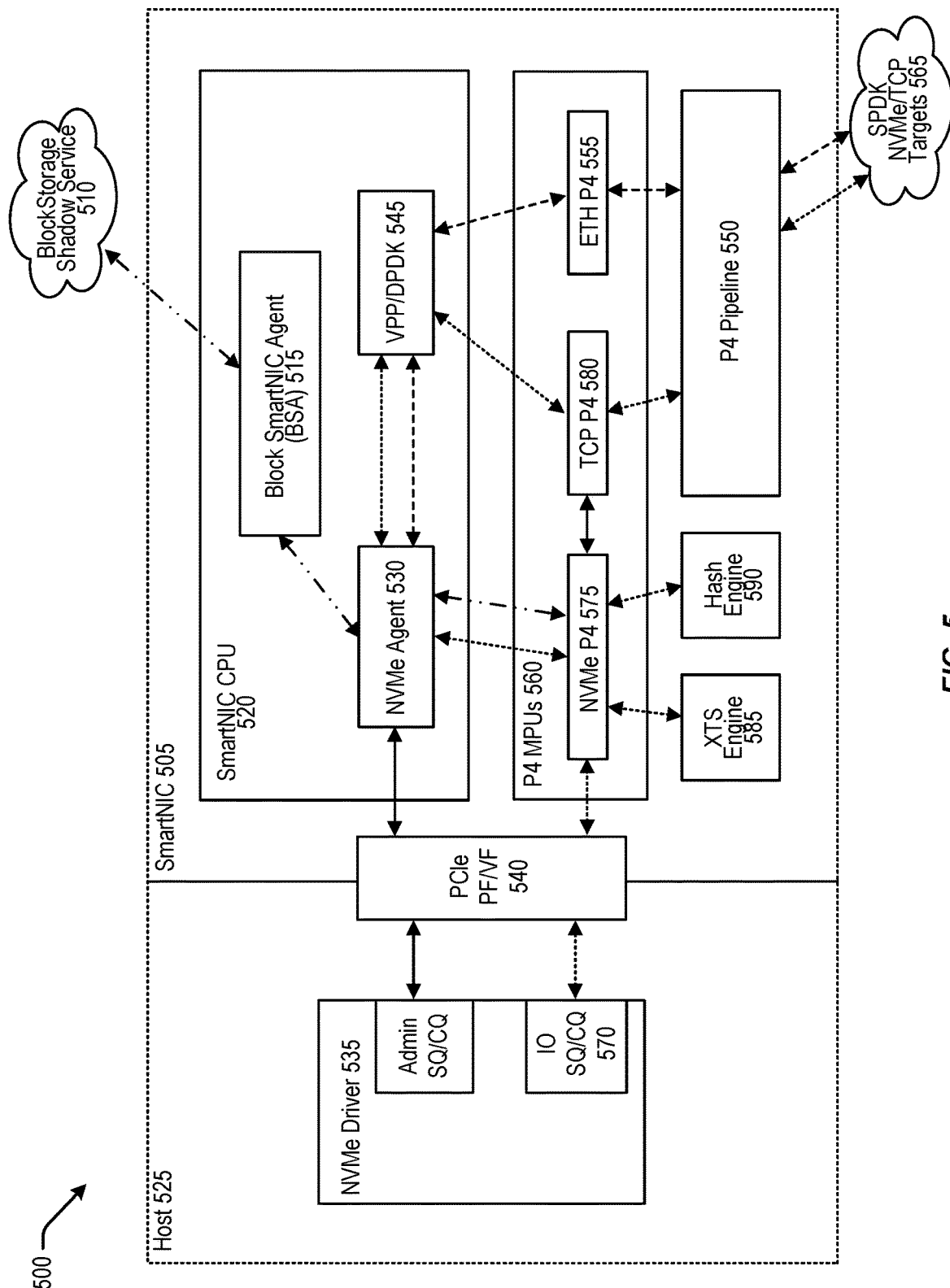
FIG. 5 is a simplified diagram of a smart network interface card (smartNIC) with Non-Volatile Memory Express (NVMe), according to an embodiment.

FIG. 5 is a simplified diagram 500 of a smart network interface card (smartNIC) with Non-Volatile Memory Express (NVMe) according to an embodiment. Requests can be received at smartNIC 505 from the block storage shadow service 510 (e.g., block shadow service 155) in the control plane (e.g., block storage control plane 125, control plane 305, etc.). The requests can be received at the Block Smart-NIC Agent (BSA) 515 (e.g., BSA 160) running on the smartNIC central processing unit (CPU) 520. BSA 515 can serve a number of functions including performing health checks, ensuring that targets are available, or performing telemetry. BSA 515 forwards instructions or requests to the host 525, or other smartNIC components, via NVMe agent 530. Requests or instructions can be sent from NVMe agent 530 to the NVMe driver 535 via a PCIe physical function or virtual function (PF/VF) 540 (e.g., VF 360).

The NVMe agent 530 can establish a new I/O connection in response to a request from BSA 515 using the vector packet processing/dataplane development kit (VPP/DPDK) module 545. The VPP/DPDK module can use a framework, such as VPP with the DPDK plugin, to process and route network packets. In some embodiments, the VPP/DPDK module can use another suitable packet processing framework or functionality different from the framework or functionality of vector packet processing using the DPDK plugin. Upon receiving a request from NVMe agent 530, VPP/DPDK 545 can send a request to the P4 pipeline 550 (e.g., P4 pipeline 330) via the Ethernet (ETH) P4 module 555 running on the P4 match protection unit (MPU) 560. P4 pipeline 550 can establish an I/O connection with SPDK NVMe/TCP targets 565 (e.g., target 230, target server fleet 145, NVMe/TCP target 320a-320c, etc.). Establishing a connection can include sending instructions to NVMe driver 535 or SPDK NVMe/TCP targets 565.

The I/O communication can be offloaded to a fast path I/O pipeline after an I/O connection is established with an SPDK NVMe/TCP target 565. The I/O fast path traffic can travel along the fast path pipeline from the I/O submission queue/completion queue (SQ/CQ) 570 in host 525 to P4 MPUs 560 via PCIe PF/VF 540. I/O traffic can be received in P4 MPUs 560 at NVMe P4 575 and forwarded to the SPDK NVMe/TCP targets 565 via TCP P4 580 and P4 pipeline 550. Traffic in I/O SQ/CQ 570 can start from the submission queue f and end at the completion queue when I/O completes. If traffic along the fast path pipeline fails, NVMe P4 575 or TCP P4 580 can inform NVMe agent 530 of the failure. NVMe agent 530 can be configured so that NVMe agent can create a new I/O connection in response to the failure and offload the new connection to the fast path pipeline. XTS engine 585 is an encryption engine that can encrypt user data using the xor-encrypt-xor (XEX)-based tweaked-codebook mode with ciphertext stealing (XTS) block cypher, and hash engine 590 can use cryptographic hash functions to verify data integrity.

Figure 6:
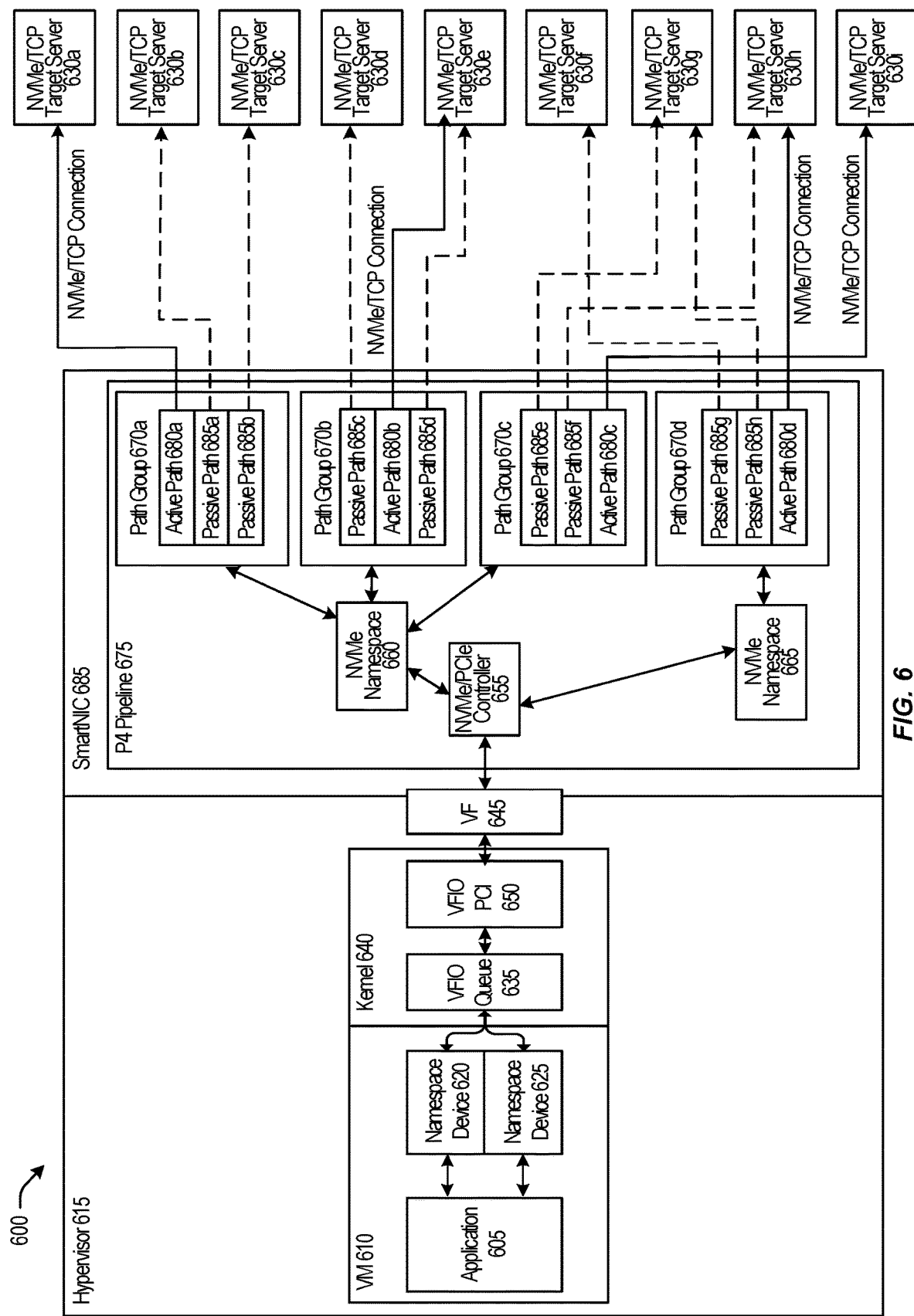
FIG. 6 is a diagram showing multipath handling in a smart network interface card (smartNIC), according to an embodiment.

FIG. 6 is a diagram 600 showing multipath handling in a smart network interface card (smartNIC) according to an embodiment. An application 605 can run in a virtual machine (VM) 610 managed by a hypervisor 615. Application 605 can be similar to application 220, and VM 610 can be a bare metal machine (e.g., VM/BM instance 340). Two namespace devices, namespace device 620 and namespace device 625, can be associated with Application 605. A namespace can be a NVM storage that is formatted for block access. A namespace can be analogous to a logical unit in SCSI, and a block storage volume can be a single namespace. Traffic between namespace device 620 or namespace device 625 and the NVMe/TCP target servers 630a-i (e.g., target server 150) can be received via the virtual function Input/Output queue (VFIO) 635 in the kernel 640. The virtual function (VF) 645 can be connected to VFIO queue 635 via the VFIO peripheral component interconnect (PCI) 650. VF 645 can be a virtual function or a physical function.

The NVMe/PCIe controller 655 (e.g., NVMe P4 1575) can route traffic from the namespace devices 620 and 625 to NVMe namespaces. For instance, traffic can be routed between namespace device 620 and NVMe namespace 660, and traffic can be routed between namespace device 625 and NVMe namespace 665. The NVMe namespaces can be associated with one or more path groups 670a-d located in the P4 pipeline 675 (e.g., P4 pipeline 550, P4 MPUs 560, etc.) in smartNIC 680 (e.g., smartNIC 165, smartNIC 270, smartNIC 505, etc.). For instance, NVMe namespace 660 can route traffic to path groups 670a-670c, and NVMe namespace 665 can route traffic to path group 670d.

Path groups can include an active path 680a-d and one or more passive paths 685a-685h. Active paths 680a-d or passive paths 685a-685h can be associated with a NVMe/TCP target server 630a-i. Traffic between a NVMe/TCP target server 630a-i and namespace device 620 or namespace device 625 can be routed via active paths 680a-d. NVMe/TCP target servers 630a-i can route traffic to and from extent servers (e.g., extent servers fleet 140, extent servers 440a-440c, etc.).

Traffic can be routed via a passive path 685a-685h if an active path 680a-d fails. In response to a failure, data associated with passive path 685a-685h can be used (e.g., NVMe agent 530, initiator 162, etc.) to login to an extent server via NVMe/TCP target servers 630a-630h. The extent server can change a token from the token associated with an active path 680a-d to a token associated with a passive path 685a-685h. The extent server can use the token to determine whether to accept traffic from a path (e.g., active paths 680a-d or passive paths 685a-685h).

Figure 7:
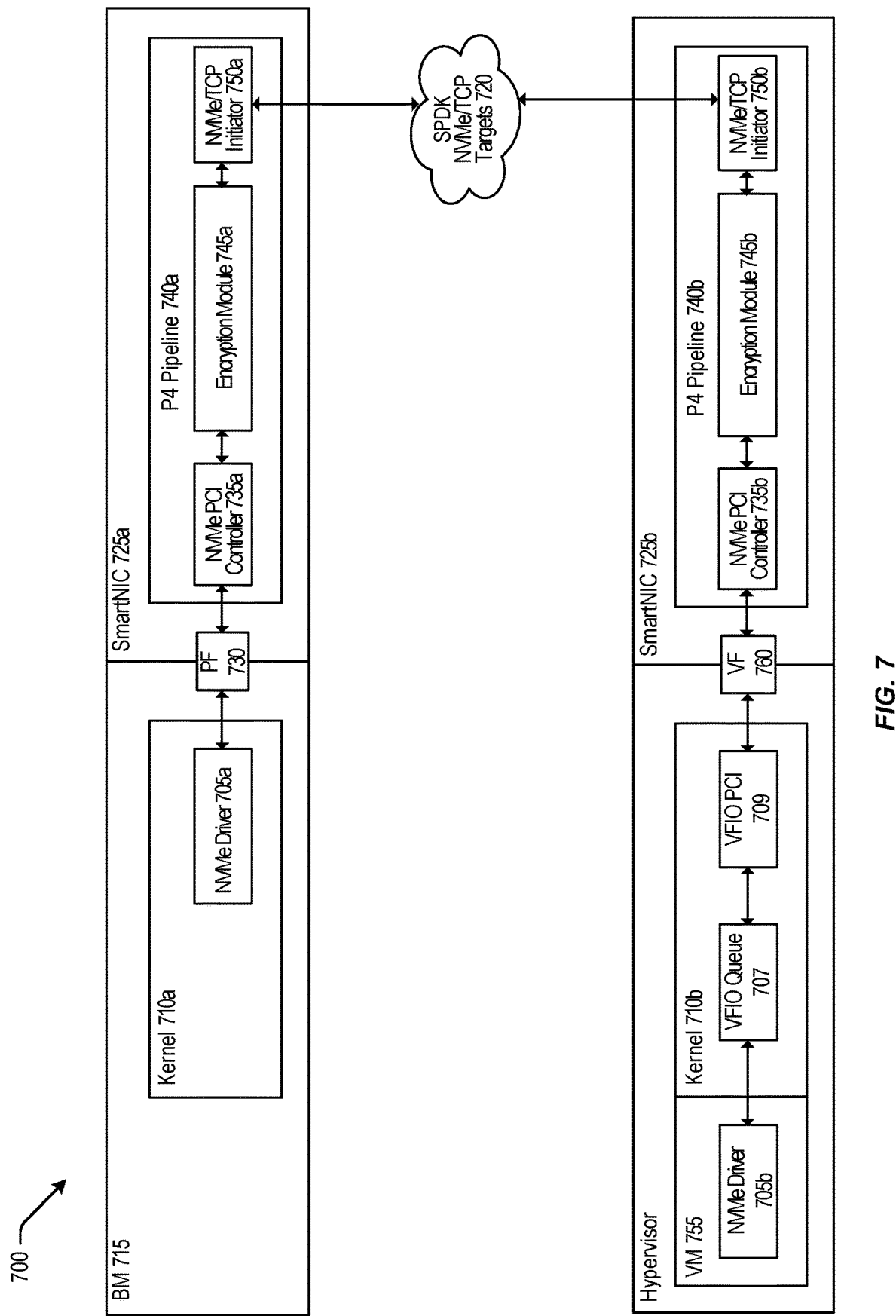
FIG. 7 shows a diagram of an architecture for performing encryption/decryption with a smart network interface card (smartNIC), according to an embodiment.

FIG. 7 shows a diagram of an architecture 700 for performing encryption/decryption with a smart network interface card (smartNIC) according to an embodiment. The architecture 700 can provide a unified means for encrypting/decrypting both VM and BM traffic. NVMe driver 705a (e.g., NVMe driver 275) can run in the kernel 710a of a bare metal (BM) machine 715 (e.g., VM/BM instance 340, etc.). Traffic can be sent from NVMe driver to SPDK NVMe/TCP targets 720 via smartNIC 725a. The BM traffic can be received via a physical function (PF) 730 (e.g., PCIe PF/VF 540, etc.) at the NVMe PCI controller 735a (e.g., NVMe/PCIe controller 655, NVMe P4 575, etc.) in the P4 pipeline 740a (e.g., P4 MPUs 560, P4 pipeline 550, etc.).

Outgoing BM traffic traveling from NVMe driver 705a to SPDK NVMe/TCP targets 720 can be encrypted by the encryption module 745a in smartNIC 725a, and incoming BM traffic can be decrypted by the encryption module 745a. Encryption module 745a can encrypt or decrypt traffic using an encryption algorithm such as Advanced Encryption Standard (AES). The encrypted BM traffic can be sent to SPDK NVMe/TCP targets 720 via the NVMe/TCP initiator 750a (e.g., NVMe initiator 280, NVMe/TCP initiator 325, NVMe agent 530, etc.). Incoming encrypted BM traffic from SPDK NVMe/TCP targets 720 can be received at NVMe/TCP initiator 750a before being forwarded along the pathway to NVMe driver 705a. Incoming encrypted BM traffic can be decrypted by the encryption module 745a.

Outgoing VM traffic can be sent from NVMe driver 705b in the virtual machine (VM) 755 (e.g., VM/BM instance 340, VM 610, etc.) to the virtual function Input/Output (VFIO) Queue 707 (e.g., VFIO queue 635) in kernel 710b and on to a virtual function (VF) 760 (e.g., VF 360, VF 645, etc.) via a VFIO PCI 709 (e.g., VFIO PCI 650). The outgoing VM traffic can be forwarded to NVMe PCI controller 735b (e.g., NVMe/PCIe controller 655, NVMe P4 575, etc.) in the P4 pipeline 740b (e.g., P4 MPUs 560, P4 pipeline 550, etc.). The outgoing VM traffic can be forwarded from smartNIC 725b to SPDK NVMe/TCP targets 720 via encryption module 745b and NVMe/TCP initiator 750b (e.g., NVMe initiator 280, NVMe/TCP initiator 325, NVMe agent 530, etc.). Incoming VM traffic from SPDK NVMe/TCP targets 720 can be received at NVMe/TCP initiator 750b (e.g., NVMe initiator 280, NVMe/TCP initiator 325, NVMe agent 530, etc.) before the incoming traffic is forwarded along the pathway to NVMe driver 705b. Incoming encrypted VM traffic can be decrypted by the encryption module 745a.

Load-Based NVMe Over TCP Connection Management

Block input/output operations, including read operations and write operations, may be issued by the operating system at a VM or BM, and sent through an NVMe PCIe interface by a NVMe driver. Input/output operations may be sent though an NVMe P4 pipeline and may be transported a remote block storage backend using an NVMe over fabric (e.g., TCP/IP) protocol. The transport and processing of input/output operations through the fabric/network costs extra time, which is observed as added end-to-end latency. Extra delays that are introduced by packet drop or re-transmission are experienced as latency jittering to the host. Thus, users who run latency sensitive applications usually choose compute shapes with local solid-state drives to get the lowest latency with minimum jitters. However, there are a few shortcomings of using local SSDs. First, local SSDs do not provide the managed service that remote block storage service provides, which include replication based availability guarantees, and backup/restore services. Additionally, local SSDs are dedicated resource that are not as cost-effective as remote block storage service, which charges based on user demands. In addition, the size of local SSDs is usually fixed, and may not be flexible enough to satisfy the user's need. In contrast, remote block storage provides online resizing capability so user's can grow the volume dynamically based on demand.

The persistent storage techniques discussed in the following figures take advantage of both local storage and remote block storage service for an NVMe over TCP ("NVMeOTCP") attachment. By equipping the smartNIC with a local persistent memory (or at least persistent memory at the host machine), we are able to use it as a cache for block input/output operations to improve latency and jitters. The persistent memory could be in a form of local SSD that is plugged in as PCIe device to the SmartNIC, or an integrated NVRAM or NVDIMM, etc. Meanwhile, remote block storage may be working as a relatively slower backup persistent layer managed service to provide replication based availability guarantees and backup/restore services. In some embodiments, multiple persistent memory storage devices can be utilized for the persistent storage managed by the smartNIC (e.g., using any suitable combination of SSD(s) of the host device and/or NVRAM(s) and/or NVDIMM(s) of the smartNIC) to provide replication and backup/restore capabilities of the data cached by the smartNIC. The aforementioned techniques are described in more detail in the following figures.

Figure 8:
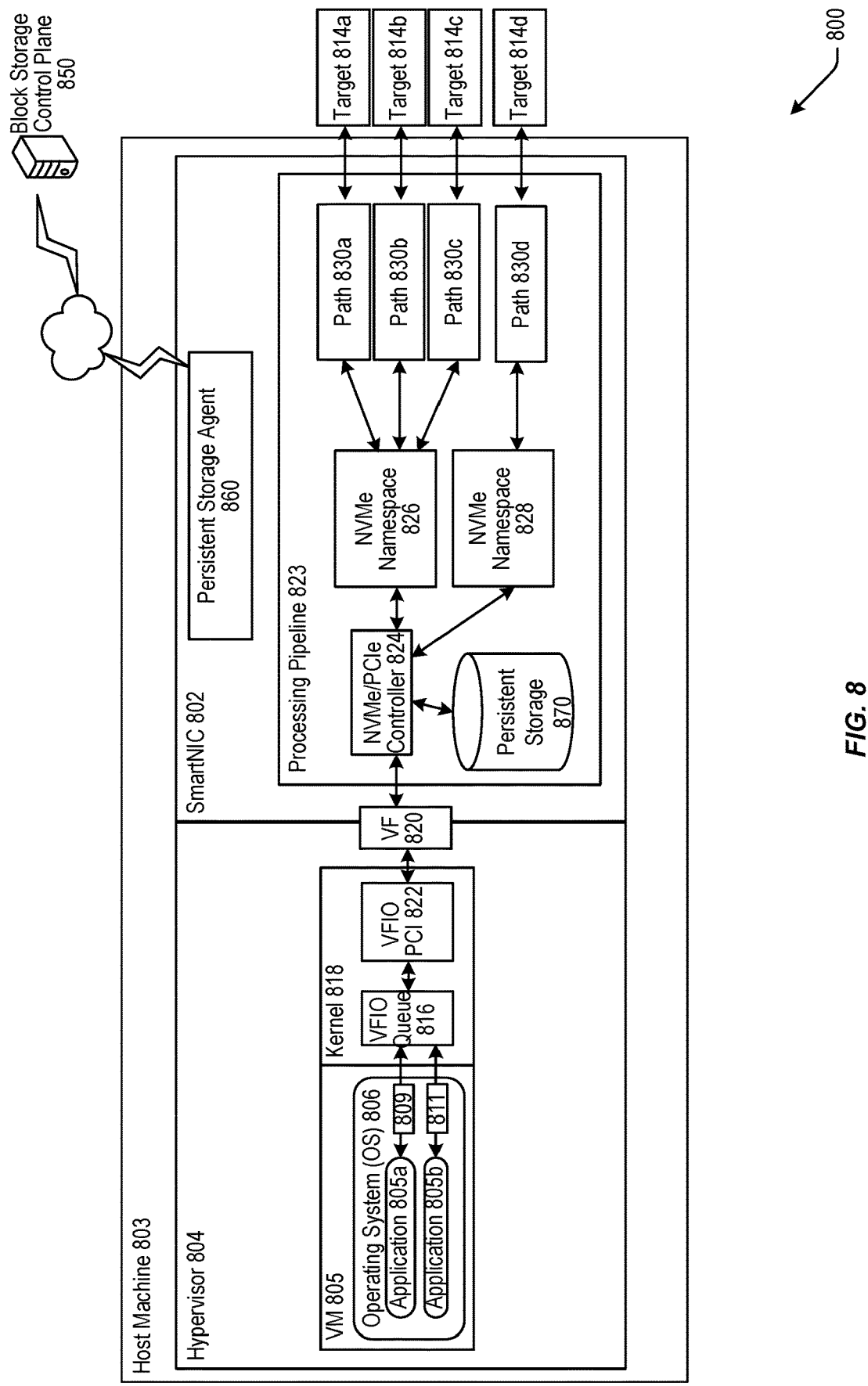
FIG. 8 is a diagram of another example showing multipath handling in a smart network interface card (smartNIC), according to an embodiment.

FIG. 8 is a diagram 800 showing another example of multipath handling in a smart network interface card (smartNIC) 802 (e.g., smartNIC 685 of FIG. 6), according to an embodiment. The smartNIC 802 may be part of a host machine (e.g., host machine 803) of a cloud computing environment on which hypervisor 804 executes. Hypervisor 804 may be configured to manage one or more virtual machines (e.g., VM 805) hosted by the host machine. Each VM may be a virtual machine, or a bare metal instance can be similarly utilized in lieu of a VM to the examples provided herein. One or more applications can run at each of the VMs (e.g., VM 805) at an operating system of the VM. By way of example, applications 805a and 805b may execute within operating system (OS) 806 at VM 805. Applications 805a and 805b may be similar to application 220, 605, etc. VM 805 and applications 805a and 805b may be associated with a particular tenant/customer of a cloud computing environment while other VMs and/or applications may be associated with the same or different tenant/customer. Applications 805a and/or 805b may be configured to send and receive data to and from a corresponding block storage data plane (BSDP) component. For example, application 805a may be configured to transmit and receive data through processing pipeline 823 to a BSDP volume associated with a first namespace. Likewise, application 807b may be configured to transmit and receive data through processing pipeline 823 to a BSDP volume associated with a second namespace.

Namespace device 809 and namespace device 811, which are examples of namespace device 620 and namespace device 625, can be associated with each application (e.g., application 805a and 805b, respectively). In some embodiments, an application may provide data corresponding to multiple namespaces. Therefore, multiple namespace devices may be utilized with a single application. A namespace may be associated with a non-volatile memory (NVM) storage that is formatted for block access. By way of example, a given namespace may be associated with a particular block storage volume of a block storage data plane of a cloud computing environment (e.g., the block storage data plane (BSDP) of FIG. 1, including extent servers fleet 140, one or more of which may be configured to provide a block storage volume/persistent storage within the BSDP). A namespace can be analogous to a logical unit in SCSI, and a block storage volume can be associated with a single namespace. Traffic may be routed along the path from application 805a, through namespace device 809, to NVMe namespace 826 and on to NVMe/TCP target servers associated with the same namespace (e.g., targets 814a-c, examples of the target server fleet 145). Each of the targets 814a-c may serve as an endpoint that manages data receipt and/or transmissions that utilize TCP connections that are associated with the same namespace. Target 814d may serve as an endpoint that manages data receipt and/or transmissions that utilize TCP connections that associated with another namespace and corresponding block storage volume. In some embodiments, each of targets 814a-d are configured to receive data from a single and unique path for which the other endpoint corresponds to a unique IP address associated with the smartNIC. In some embodiments, each of targets 814a-d are configured to receive data from a single and unique path for which the other endpoint corresponds to a unique IP address associated with the smartNIC. Data received from the applications may be provided to the virtual function Input/Output queue (VFIO) 816 (e.g., the VFIO queue 635) in kernel 818 (an example of kernel 640). The virtual function (VF) 820 (an example of VF 645) may be connected to VFIO queue 816 via the VFIO peripheral component interconnect (PCI) 822 (an example of the VFIO PCI 650). VF 820 can be a virtual function or a physical function.

Processing pipeline 823 may include NVMe/PCIe controller 824, NVMe namespaces 826 and 828, and paths 830a-d. The NVMe/PCIe controller 824 (an example of NVMe P4 1575, NVMe/PCIe controller 655, etc.) may route traffic from the namespace devices 809 and 811 to NVMe namespaces 826 and 828, respectively. For instance, traffic can be routed between namespace device 809 and NVMe namespace 826, and traffic can be routed between namespace device 811 and NVMe namespace 828. The NVMe namespaces can be associated with one or more paths (e.g., paths 830*a*-*d*, collectively referred to as "paths 830"). Each path 830*a*-*d* may correspond to one or more active or passive network paths ("active paths" or "passive paths," for brevity). Each of the paths 830 may include a single active path. In some embodiments, the paths 830*a*-*d* may individually correspond to a path group described in connection with FIG. 6 that may include a single active path and two passive paths. Each of the active and/or passive paths of paths 830 may be individually associated with a unique IP address assigned to the smartNIC. Each smartNIC IP address for a given path (path 830*a*) may differ from the smartNIC IP addresses used for the other paths (paths 830*b*-*d*) of paths 830.

The paths 830*a*-*d* may individually be associated with a namespace corresponding to a particular BSDP volume (e.g., BSDP persistent storage). As depicted, paths 830*a*-*c* are associated with a namespace with which targets 814*a*-*c* are also associated (e.g., NVMe namespace 826). As another example, path 830*d* may be associated with a namespace with which target 814*d* is associated (e.g., NVMe namespace 828). Targets 814*a*-*c* may receive data via paths 830*a*-*c* intended for a particular BSDP volume/persistent storage. Targets 814*a*-*c* may transmit data from the BSDP volume/persistent storage along paths 830*a*-*c* to ultimately provide data to application 805*a*. Similarly, target 814*d* may receive data via path 830*d* intended for another BSDP volume/persistent storage. Target 814*d* may transmit data from the BSDP volume/persistent storage along path 830*d* to ultimately provide data to application 805*b*.

The number of paths corresponding to a particular BSDP volume/persistent storage may be identified based at least in part on a performance threshold associated with the BSDP volume/persistent storage. By way of example a particular BSDP volume may be associated with a performance threshold that indicates the BSDP volume can process up to 2 million input/output operations per second (IOPS). Each of the paths 830*a*-*d* may be associated with a performance capability indicating the maximum IOPS each path can sustain. In some embodiments, the performance capability of a path is the same for every path (e.g., 60,000 IOPS). In some embodiments, block storage control plane 850 (an example of the block storage control plane 125) may be configured to identify a total number of active paths of a given performance capability (60,000 IOPS) needed to meet the performance threshold associated with the BSDP volume (2 million IOPS). The particular number of paths 830 depicted in FIG. 8 is not intended to limit the scope of this disclosure. A greater or fewer number of paths may be utilized. Configuration information may be provided by the block storage control plane (BSCP) 850 to an agent executing at the smartNIC 802 (e.g., BSA 160, agent 310, BSA 515, etc., not depicted here) which in turn may utilize the process discussed in connection with FIG. 5 to establish TCP connections corresponding to every active path. The agent may refrain from having TCP connections for passive paths established while the passive paths are designated as being passive. The agent may change paths from active to passive, and vice versa, at any suitable time based on, for example, network conditions.

SmartNIC 802 may include persistent storage agent 860. Persistent storage agent 860 may be an example of BSA 160, agent 310, BSA 515, etc. The persistent storage agent 860 may be a software agent executed by the processor(s) of SmartNIC 802 (e.g., smartNIC CPU 520). The persistent storage agent 860 may be configured to receive configuration parameters from the BSCP 850. Configuration parameters (also referred to as "configuration data") may include a mode indicator. In some embodiments, the mode indicator may indicate usage policies for a persistent storage of the smartNIC 802 (e.g., persistent storage 870). The mode indicator may indicate a first mode corresponding to utilizing the persistent storage at the host machine for both read operations and write operations, a second mode (e.g., a "passthrough mode" indicating that the persistent storage at the host machine is not to be used for read operations and write operations, a third mode indicating that the persistent storage at the host machine is to be used for only write operations, and a fourth mode for only read operations. In some embodiments, the usage policies may be provided as part of the configuration data and used to configure system to use the persistent storage 870 in accordance with the usage policies.

In some embodiments, the freshness of the remote block storage volume can also be configured based on the configuration data provided to the persistent storage agent 860 and subsequent use of the persistent storage 870. By way of example, a threshold value may be provided within the configuration data to limit a write buffer size for the persistent storage 870. This threshold value may be used to ensure the amount of data written to the persistent storage 870 due to processing write operations by the smartNIC does not reach a size that exceeds the threshold value.

As depicted, persistent storage 870 may be in memory at the smartNIC 802. However, in some embodiments, persistent storage 870 may be a local storage device of the host machine, that is accessible to the smartNIC 802. In some embodiments, persistent storage 870 may include multiple storage devices, any combination of which may be local to the smartNIC or the host machine, which provide data replication and data recovery functionality similar to those provided at the block storage data plane. In some embodiments, persistent storage 870 may be configured to process over a threshold number of input/output operations per second (e.g., 2 million IOPS).

Figure 9:
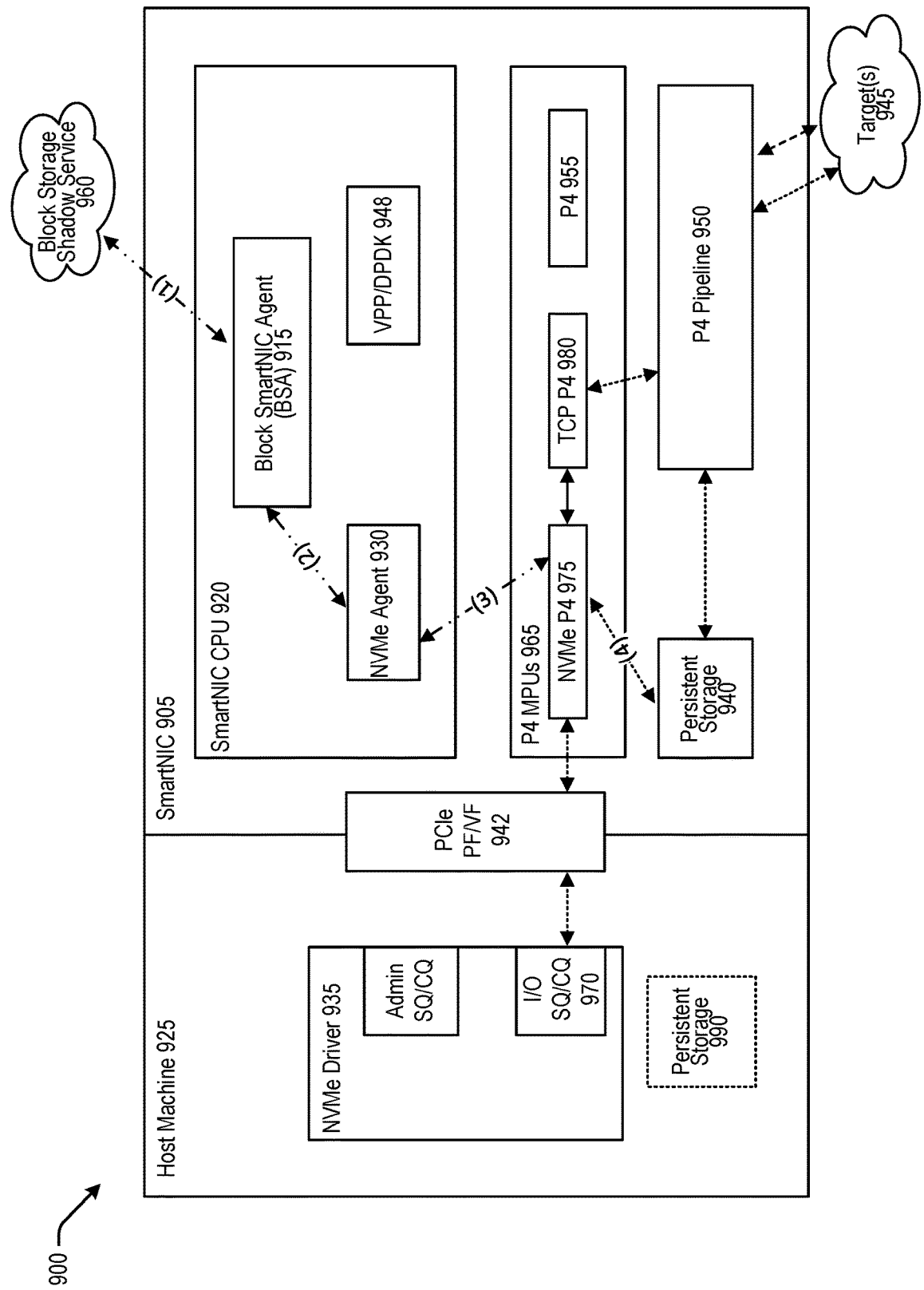
FIG. 9 shows a simplified diagram of a smart network interface card with persistent storage and a process for configuring use of the persistent storage, according to an embodiment.

FIG. 9 shows a simplified diagram of a smart network interface card with persistent storage and a process 900 for configuring use of the persistent storage, according to an embodiment. The components of FIG. 9 may generally correspond to the components discussed in connection with FIG. 5. Configuration data can be received at smartNIC 905 (e.g., smartNIC 802) from a block storage control plane component such as the block storage shadow service 960 (e.g., block shadow service 155) in the control plane (e.g., block storage control plane 125, control plane 305, etc.). The requests can be received at the Block SmartNIC Agent (BSA) 915 (e.g., BSA 160) or another agent (e.g., the persistent storage agent 860) running on the smartNIC central processing unit (CPU) 920. BSA 915 can serve a number of functions including performing health checks, ensuring that targets are available, or performing telemetry. BSA 915 forwards instructions, data, or requests to the host machine 925, or other smartNIC components, via NVMe Agent 930 (e.g., NVMe agent 530). Requests, data, or instructions can be sent from NVMe Agent 930 to the NVMe driver 935 via a PCIe physical function or virtual function (PF/VF) such as PCIe PF/VF 942 (e.g., VF 360, VF 820).

The NVMe agent 930 can establish a new I/O connection in response to a request from BSA 915 using the vector packet processing/dataplane development kit (VPP/DPDK)

module 948, in the manner described in connection with FIG. 5 using the VPP/DPDK 948 (e.g., the VPP/DPDK 545) and the P4 module 955 (e.g., ETH P4 module 555) to make a request to the P4 pipeline 950 (e.g., P4 pipeline 550). The P4 pipeline 950 can establish an I/O connection with target(s) 945 (e.g., SPDK NVMe/TCP targets 565, an example of target 230, target server fleet 145, NVMe/TCP target 320a-320c, etc.). Establishing a connection can include sending instructions to NVMe driver 935 or SPDK NVMe/TCP targets 565.

The I/O communications later received by the NVMe P4 975 (e.g., the NVMe/PCIe Controller 824) can be offloaded to a fast path I/O pipeline after an I/O connection (NVMe/TCP connection) is established with a target of target(s) 945 (e.g., SPDK NVMe/TCP target 565). The I/O fast path traffic can travel along the fast path pipeline from the I/O submission queue/completion queue (SQ/CQ) 970 in host machine 925 to P4 MPUs 965 (e.g., P4 MPUs 560) via PCIe PF/VF 942 (e.g., PCIe PF/VF 540). I/O traffic can be received in P4 MPUs 965 at NVMe P4 975 and forwarded to the target of target(s) 945 via TCP P4 980 and P4 pipeline 950. Traffic in I/O SQ/CQ 970 can start from the submission queue and end at the completion queue when I/O completes. If traffic along the fast path pipeline fails, NVMe P4 975 or TCP P4 980 can inform NVMe agent 930 of the failure. NVMe agent 930 can be configured so that NVMe agent 930 can create a new I/O connection in response to the failure and offload the new connection to the fast path pipeline.

As part of a process for configuring use of the persistent storage 940, at step 1, the BSA 915 may receive configuration data from the block storage shadow service 960 (or another suitable block storage control plane component). As discussed above, the configuration data may include any suitable combination of a mode indicator (e.g., indicating whether the persistent cache is to be used for read and/or write operations, or not at all), one or more usage policies, and/or a threshold value indicating a threshold size or amount with which purging/flushing the persistent storage 940 may utilize. In some embodiments, the threshold value may indicate a maximum percentage of the persistent storage 940 for which blocks that are written to the persistent storage 940 but have not been written to a block storage data plane volume, are not to exceed.

At step 2, the BSA 915 may provide the configuration data to NVMe Agent 930. At step 3, NVMe agent 930 may utilize an API call corresponding to configuration actions to configure the NVMe P4 975 to utilize the persistent storage 940 according to the configuration data. While the persistent storage 940 is depicted at the smartNIC, it can be local to the host machine as depicted by persistent storage 990. In some embodiments, persistent storage managed by the smartNIC may include persistent storage 940 and persistent storage 990. In some embodiments, the NVMe P4 975 may store the configuration data within persistent storage 940 (and/or persistent storage 990, depending on the use case). Any operations performed herein referring to an operation performed with or by the persistent storage 940 can be similarly applied to the persistent storage 940. In some embodiments, the persistent storage 940 may be replicated across another persistent storage of the smartNIC (not depicted) and/or by one or more devices at the host machine 925 such as the persistent storage 1090. The NVMe P4 975, persistent storage 940, persistent storage 990, or any suitable computing component such as a backend thread (not depicted here) may utilize the configuration data for subsequent input/output operation processing. The configuration data may be updated at any suitable time (e.g., via a user interface provided by the block storage control plane 130, to modify the particular input/output operations (e.g., read operations, write operations), if any, that utilize the persistent storage 940 and/or persistent storage 990.

After configuring the NVMe P4 975 and/or persistent storage 940 with configuration data, input/output operations received from the I/O SQ/CQ 970 (e.g., I/O SQ/CQ 570) may be provided via PCIe PF/VF 942 to NVMe P4 975. NVMe P4 975 may utilize the configuration data to determine whether data should be read or written from/to the persistent storage 940 based at least in part on the usage policies indicated in the configuration data. Reads and/or writes may utilize the persistent storage 940 and/or the volume(s) corresponding to target(s) 945 based at least in part on the usage policies.

In some embodiments, the NVMe P4 975 may monitor a number or percentage of "dirty blocks" in the persistent storage 940. A "dirty block" refers to a block that has been committed to the persistent storage 940 but has not been replicated or has not been written to another persistent storage managed by the smartNIC (not depicted) or to the block storage data plane volume for at least some of target(s) 945 serve as endpoint. The NVMe P4 975 may initiate a background processing thread (e.g., a cron job) to flush/purge the dirty blocks to block storage data plane. Aa high load of input/output operations may increase the number of "dirty" blocks over the thread. In this situation, NVMe P4 975 throttle subsequent received input/output operations corresponding to commands. This may eventually cause the application to slow down its input/output submissions. In some embodiments, the NVMe P4 975 may use a rate limiter to control the input/output operation flow into persistent storage 940 so it is on average less than the volume's write rate. This may reduce network jitter (e.g., potentially widely varying network latencies) even when rate of the input/output operations peak.

Figure 10:
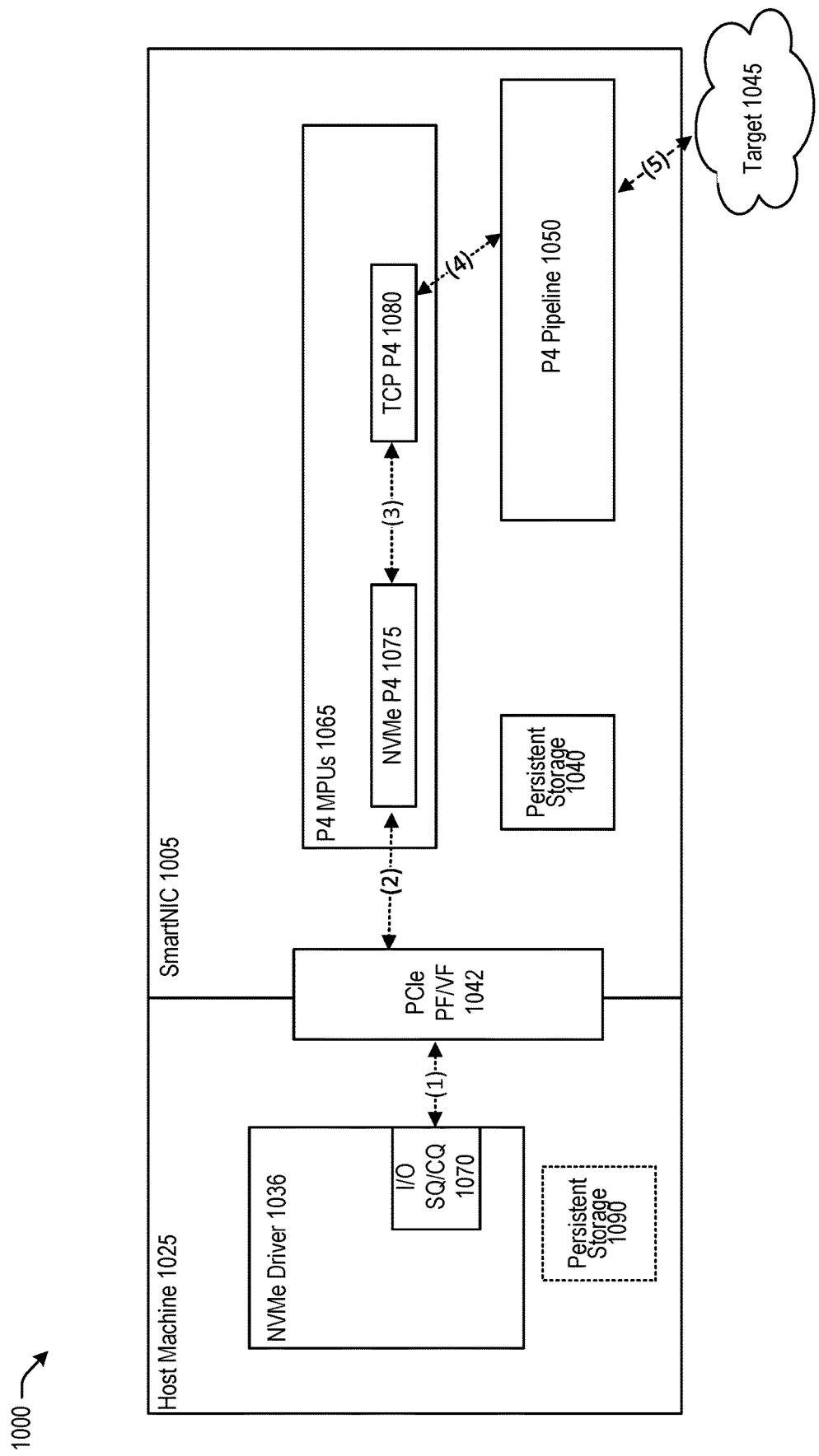
FIG. 10 shows a simplified diagram of a smart network interface card with persistent storage and a passthrough pathway provided by the smart network interface card, according to various embodiments.

FIG. 10 shows a simplified diagram 1000 of a smart network interface card with persistent storage and a pass-through pathway provided by the smart network interface card, according to various embodiments. While the persistent storage 1040 (e.g., persistent storage 940) is depicted at the smartNIC, it can be local to the host machine as depicted by persistent storage 1090 (e.g., persistent storage 990). In some embodiments, persistent storage managed by the smartNIC may include persistent storage 1040 and/or persistent storage 1090. Any suitable operation described as being performed with or by the persistent storage 1040 may additionally or alternatively be performed with or by the persistent storage 1090. The smart network interface card can include additional components such as the ones discussed in connection with FIG. 9. However, for simplicity, only a subset of those components are shown in FIG. 10.

At step 1, input/output operation (also referred to as a "data request") may be received from the I/O SQ/CQ 1070 (e.g., I/O SQ/CQ 970) may be provided via PCIe PF/VF 1042. At step 2, PCIe PF/VF 1042 may provide the input/output operation to NVMe P4 1075. NVMe P4 1075 may be configured to choose between a pool of candidate storage including the persistent storage 1040 and the non-volatile block storage corresponding to target 1045. NVMe P4 1045 may determine from the configuration data discussed in connection with FIG. 9, that the persistent storage managed by the smartNIC (e.g., persistent storage 1040 and/or persistent storage 1090) is not to be utilized for the input/output operation (e.g., a read operation or a write operation).

Based at least in part on the determination that the persistent storage managed by the smartNIC is not to be utilized (e.g., based at least in part on a mode indicator and/or usage policies of the configuration data indicating that neither read operations nor write operations are to utilize the persistent storage managed by the smartNIC, the NVMe P4 1075 may forward the input/output operation on to TCP P4 1080 at step 3. At step 4, TCP P4 1080 may forward the input/output operation to P4 pipeline 1050, which in turn may forward the input/output operation to P4 at step 5. If the input/output operation is a read operation, data read from target 1045 (e.g., one of target(s) 945) may be returned to the host machine 1025 through the same components in the reverse order.

Figure 11:
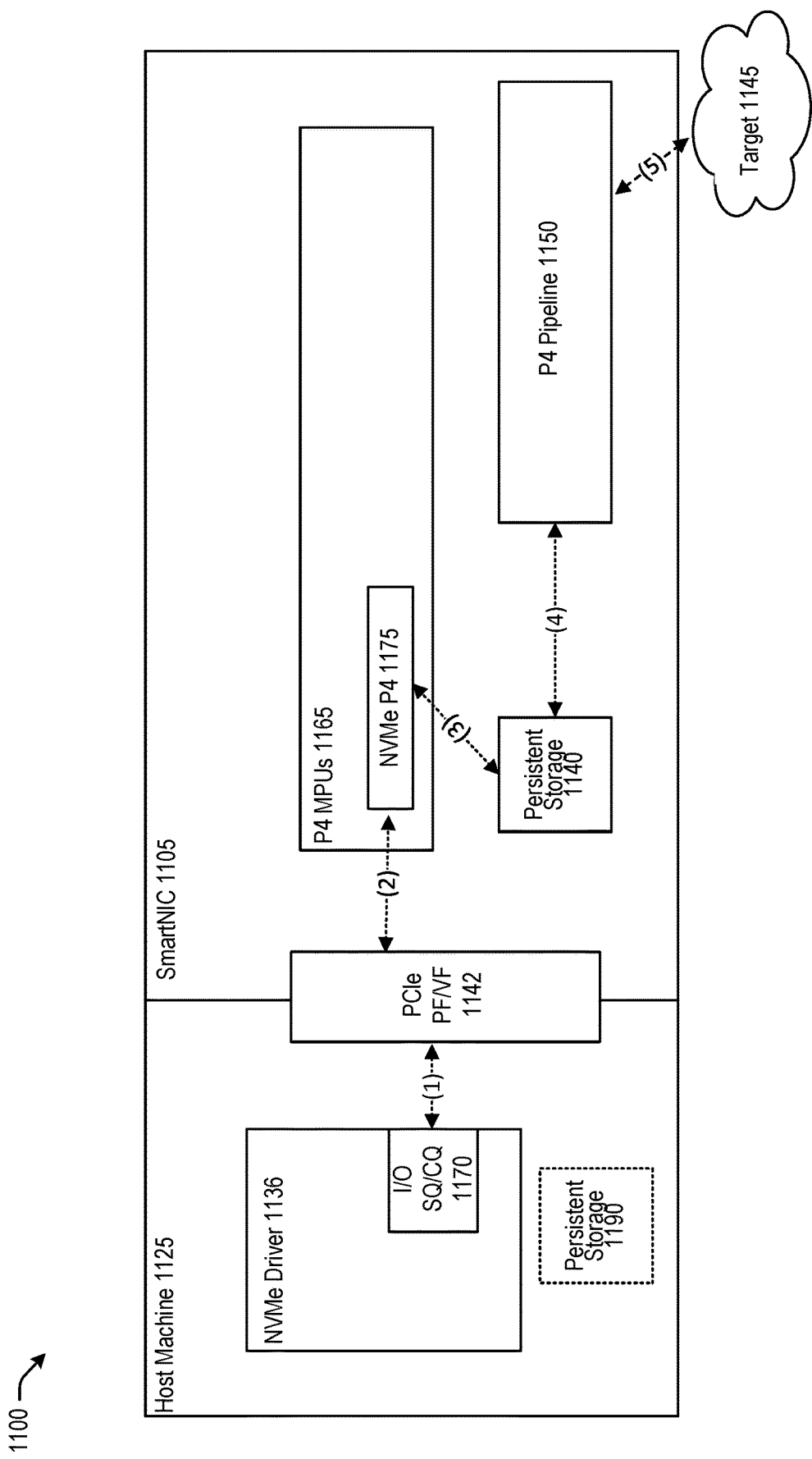
FIG. 11 shows a simplified diagram of a smart network interface card with persistent storage and processing of a write operation by the smart network interface card, according to various embodiments.

FIG. 11 shows a simplified diagram 1100 of a smart network interface card with persistent storage and processing of a write operation by the smart network interface card, according to various embodiments. While the persistent storage 1140 (e.g., persistent storage 1040) is depicted at the smartNIC, it can be local to the host machine as depicted by persistent storage 1190 (e.g., persistent storage 1090). In some embodiments, persistent storage managed by the smartNIC may include persistent storage 1140 and/or persistent storage 1190. Any suitable operation described as being performed with or by the persistent storage 1140 may additionally or alternatively be performed with or by the persistent storage 1190. The smart network interface card can include additional components such as the ones discussed in connection with FIG. 9 and/or FIG. 10. However, for simplicity, only a subset of those components are shown in FIG. 11.

At step 1, input/output operation (e.g., a write operation) may be received from the I/O SQ/CQ 1170 (e.g., I/O SQ/CQ 1070) may be provided via PCIe PF/VF 1142. At step 2, PCIe PF/VF 1142 may provide the input/output operation to NVMe P4 1175 (e.g., NVMe P4 1075). NVMe P4 1175 may be configured to choose between a pool of candidate storage including the persistent storage 1140 and the non-volatile block storage corresponding to target 1045. NVMe P4 1045 may determine from the configuration data discussed in connection with FIG. 9, that the persistent storage managed by the smartNIC (e.g., persistent storage 1140 and/or persistent storage 1190) is to be utilized for the input/output operation (e.g., a write operation).

Based at least in part on the determination that the persistent storage managed by the smartNIC is to be utilized (e.g., based at least in part on a mode indicator and/or usage policies of the configuration data indicating that write operations are to utilize the persistent storage managed by the smartNIC), the NVMe P4 1175 may perform the write operation with persistent storage 1140 to commit the data payload of the write operation (e.g., a block) to persistent storage 1140 rather than forwarding it to target 1145 as described in connection with FIG. 10. In some embodiments, a response may be provided to the NVMe Driver 1136 by the NVMe P4 1175 via the PCIe PF/VF 1142 once the block has been committed to persistent storage 1140.

At step 4, a processing thread of the P4 pipeline 1050 may retrieve the block written to persistent storage 1040 and transmit a write operation with the block (e.g., the data payload) to target 1145 at a subsequent time. The processing thread of the P4 pipeline 1050 may be configured to perform these operations according to a predefined periodicity, frequency or schedule. In some embodiments, the NVMe P4 1175 may monitor the number and/or percentage of dirty blocks (e.g., blocks/data payloads that have been committed to persistent storage 1140, but not at the block volume corresponding to the target 1145) based at least in part on a threshold value provided in the configuration data discussed in connection with FIG. 9. If the number or percentage of dirty blocks of the persistent storage 1140 breaches the threshold value, the NVMe P4 1175 may send instructions to P4 Pipeline 1150 (e.g., via TCP P4 980) to cause the processing thread to be initiated and for the dirty blocks of persistent storage to be written to the target 1145. The dirty blocks of persistent storage 1140 may be removed from persistent storage 1140 once committed to the block volume corresponding to target 1145.

If multiple devices are used for persistent storage managed by the smartNIC (e.g., multiple instance of persistent storage and/or multiple instances of persistent storage 990), the blocks of persistent storage 940 may be replicated across any suitable combination of the multiple blocks to provide data recovery at any suitable time (e.g., should persistent storage 940 become unavailable or inoperable).

Figure 12:
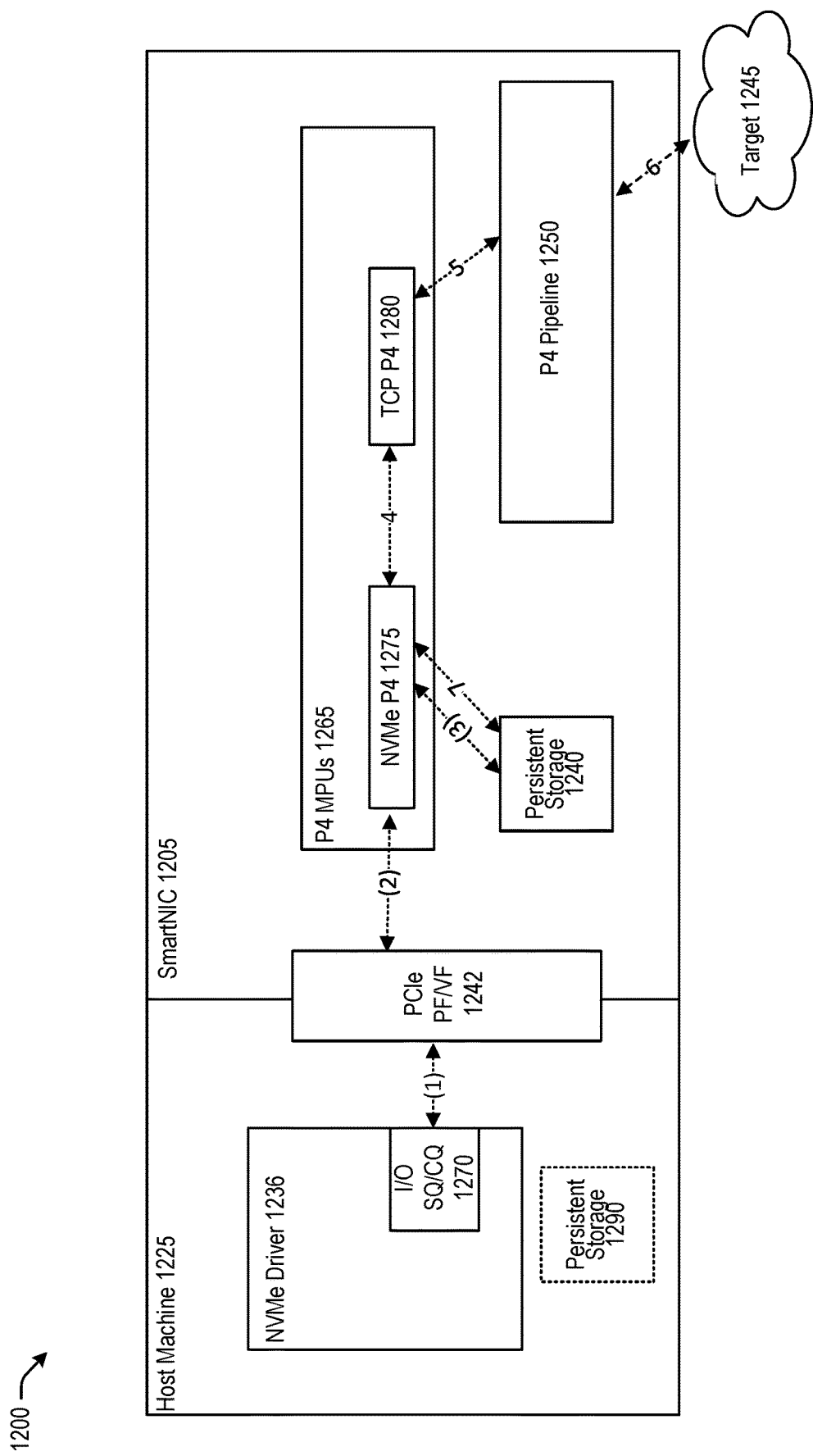
FIG. 12 shows a simplified diagram of a smart network interface card with persistent storage and processing of a read operation by the smart network interface card, according to various embodiments.

FIG. 12 shows a simplified diagram 1200 of a smart network interface card with persistent storage and processing of a read operation by the smart network interface card, according to various embodiments. While the persistent storage 1240 (e.g., persistent storage 1040, persistent storage 1140) is depicted at the smartNIC, it can be local to the host machine as depicted by persistent storage 1290 (e.g., persistent storage 1090, persistent storage 1190). In some embodiments, persistent storage managed by the smartNIC may include persistent storage 1240 and/or persistent storage 1290. Any suitable operation described as being performed with or by the persistent storage 1240 may additionally or alternatively be performed with or by the persistent storage 1290. The smart network interface card can include additional components such as the ones discussed in connection with FIG. 9. However, for simplicity, only a subset of those components are shown in FIG. 12.

At step 1, input/output operation (e.g., a read operation) may be received from the I/O SQ/CQ 1270 (e.g., I/O SQ/CQ 1170) may be provided via PCIe PF/VF 1242 (e.g., PCIe PF/VF 1042). At step 2, PCIe PF/VF 1042 may provide the input/output operation to NVMe P4 1275 (e.g., NVMe P4 1175). NVMe P4 1275 may be configured to choose between a pool of candidate storage including the persistent storage 1240 and the non-volatile block storage corresponding to target 1045. NVMe P4 1245 may determine from the configuration data discussed in connection with FIG. 9, that the persistent storage managed by the smartNIC (e.g., persistent storage 1240 and/or persistent storage 1290) is to be utilized for the input/output operation (e.g., a read operation).

At step 3, based at least in part on the determination that the persistent storage managed by the smartNIC is to be utilized (e.g., based at least in part on a mode indicator and/or usage policies of the configuration data indicating that read operations are to utilize the persistent storage managed by the smartNIC), the NVMe P4 1275 may determine whether the data requested by the read operation (e.g., a block) is stored in persistent storage 1240 or if persistent storage 1240 is lacking the data payload corresponding to the read request. If so, the NVMe P4 1275 may obtain the block data payload and provide it to NVMe driver 1236. If, however, the block is not currently stored in persistent storage 1240, the NVMe P4 1275 may forward the read operation to TCP P4 1280 at step 4, which in turn can provide the read operation to P4 pipeline 1250 at step 5 and on a target 1245 at step 6, as described in connection with FIG. 10. If the block (e.g., a data payload corresponding to the read operation) is found, it may be provided from the target 1245 through TCP P4 1280, NVMe P4 1275, PCIe PF/VF 1242 and on to NVMe driver 1236. In some embodiments, upon receiving the block data obtained from target 1245, the NVMe P4 1275 may store the block data in persistent storage 1240 at step 7, prior to forwarding the block data toward NVMe driver 1236.

If multiple devices are used for persistent storage managed by the smartNIC (e.g., multiple instances of persistent storage and/or multiple instances of persistent storage 990), the blocks (e.g., the block data corresponding to the read operation) of persistent storage 940 may be replicated across any suitable combination of the multiple blocks to provide data recovery at any suitable time (e.g., should persistent storage 940 become unavailable or inoperable).

In some embodiments, the configuration data may be changed via the process described in connection with FIG. 9 to cause any suitable combination of the passthrough processing of FIG. 10, write operation processing of FIG. 11, and/or read operation processing of FIG. 12 to be performed.

Figure 13:
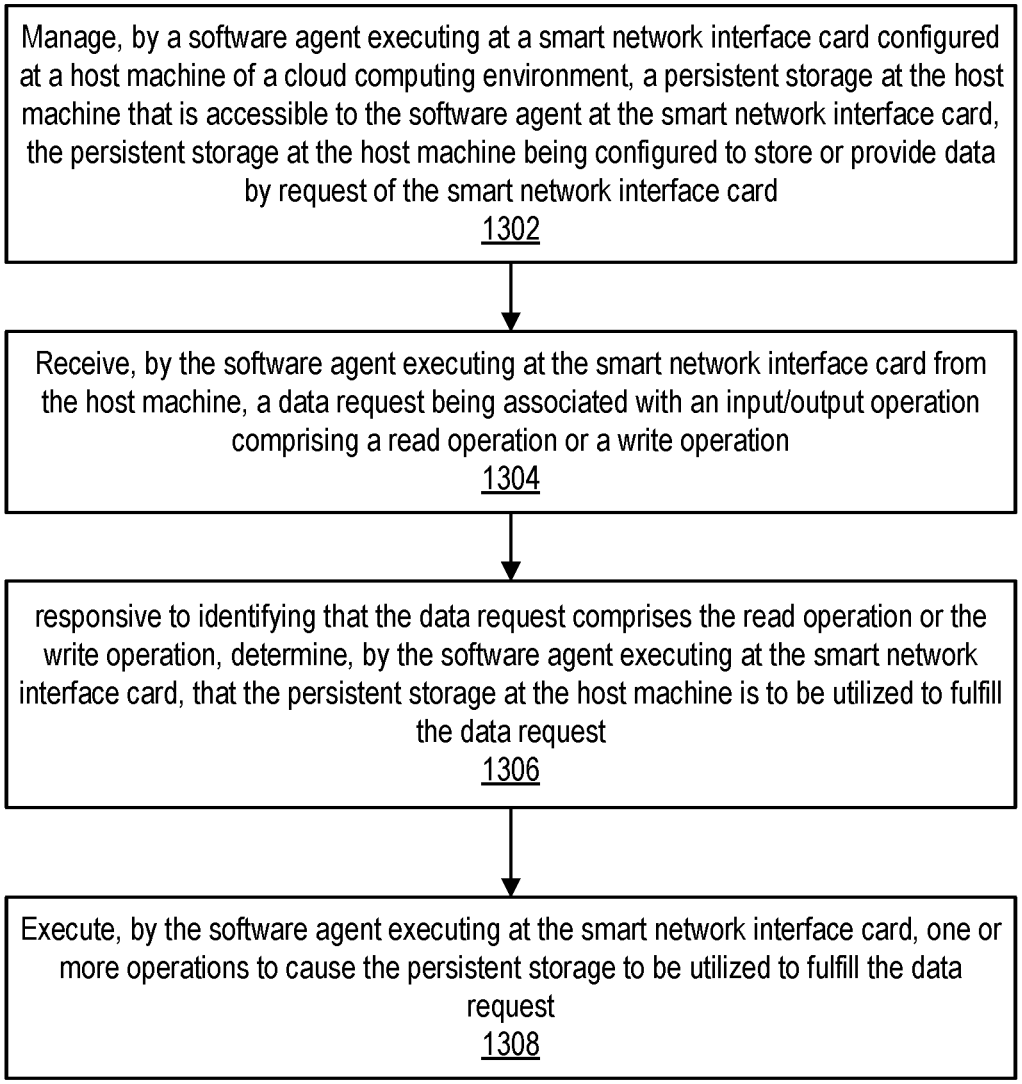
FIG. 13 is a diagram illustrating a method for managing network paths between a smartNIC and a storage data plane of a cloud computing environment, according to an embodiment.

FIG. 13 is a diagram illustrating a method 1300 for utilizing persistent storage managed at a smartNIC operating at a host machine of a cloud computing environment, according to an embodiment.

The method 1300 may begin at 1302, where a software agent (e.g., NVMe/PCIe Controller 824, NVMe P4 1075, NVMe P4 1175, NVMe P4 1275) executing at a smart network interface card (e.g., smartNIC 802) configured at a host machine (e.g., host machine 803) of a cloud computing environment, manages a persistent storage (e.g., persistent storage 940, 990, 1040, 1090, 1140, 1190, etc.) at the host machine. In some embodiments, the persistent storage is accessible to the software agent at the smart network interface card. The persistent storage at the host machine may be configured to store or provide data by request of the smart network interface card. By way of example, the persistent storage may be utilized in the manner described in FIGS. 10 and/or 11 to process and/or store data according to read and/or write operations received at the smartNIC.

At 1304, the software agent executing at the smart network interface card may receive, from the host machine, a data request that is associated with an input/output operation comprising a read operation or a write operation.

At 1306, responsive to identifying that the data request comprises the read operation or the write operation, the software agent executing at the smart network interface card may determine (e.g., based at least in part on the configuration data discussed in connection with FIG. 9) that the persistent storage at the host machine is to be utilized to fulfill the data request. By way of example, configuration data may include any suitable number of configuration parameters. In some embodiments, the configuration data may include a mode indicator. The mode indicator may indicate usage policies for a persistent storage of the smartNIC (e.g., persistent storage 870). The mode indicator may indicate a first mode corresponding to utilizing the persistent storage at the host machine for both read operations and write operations, a second mode (e.g., a "passthrough mode" indicating that the persistent storage at the host machine is not to be used for read operations and write operations, a third mode indicating that the persistent storage at the host machine is to be used for only write operations, and a fourth mode for only read operations. In some embodiments, the usage policies may be provided as part of the configuration data and used to configure system to use the persistent storage 870 in accordance with the usage policies. Usage policies may include any suitable threshold value for purging/flushing the persistent storage or policies for identifying when to move and/or delete data from the persistent storage. For example, one policy may specify that data is to remove from the persistent storage and stored at a block storage volume in the block storage data plane after a time period defined by the policy. For example, one policy may specify that data is to be deleted from the persistent storage if one or more conditions are met (e.g., a second time period has elapsed, the persistent storage is approaching a maximum storage limit/fullness, etc.).

At 1308, the software agent executing at the smart network interface card may execute one or more operations to cause the persistent storage to be utilized to fulfill the data request. Sample operations executed by the software agent are provided above with respect to FIGS. 10-12.

Infrastructure as a Service Architecture

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 14:
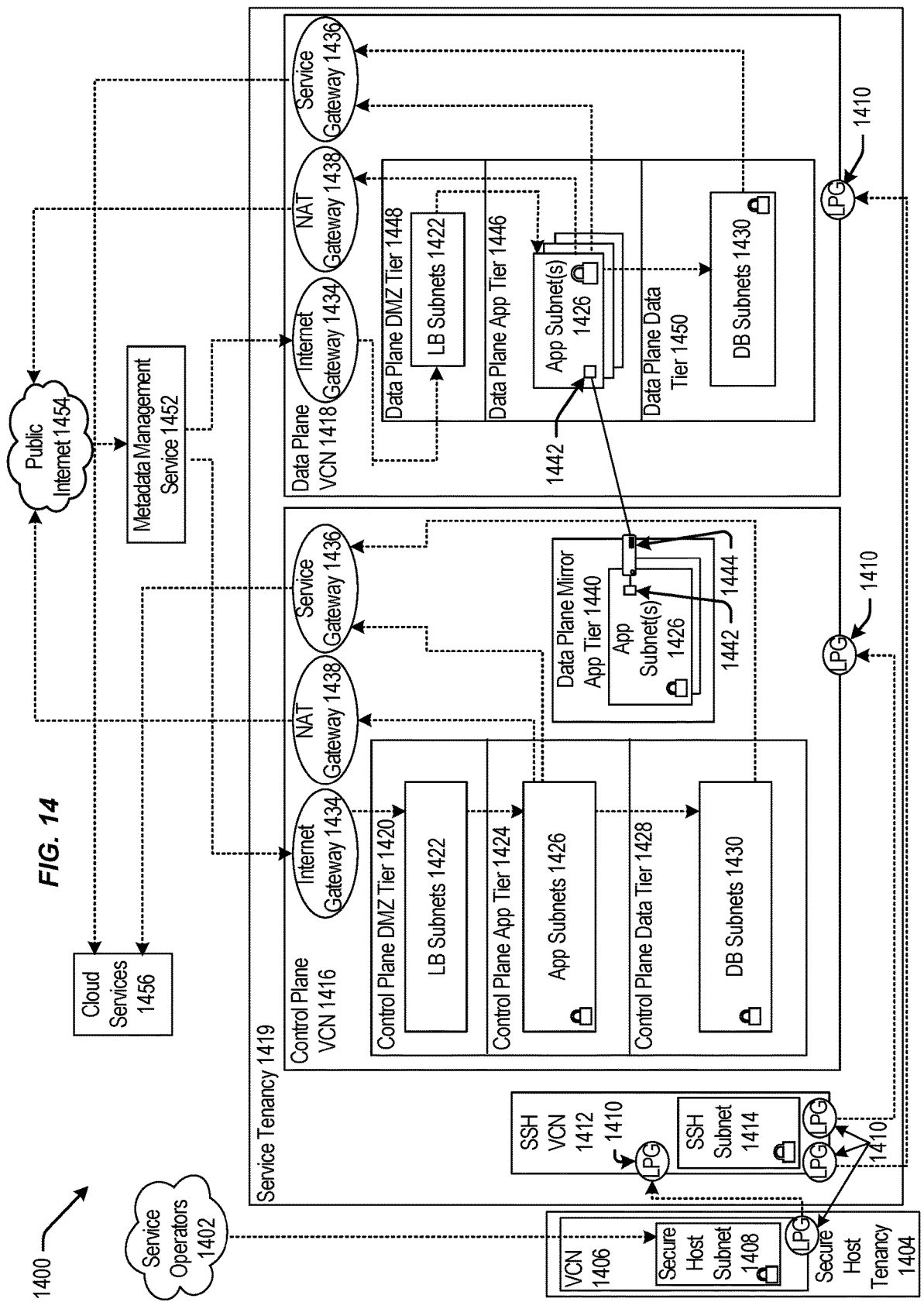
FIG. 14 is a block diagram illustrating one pattern for implementing a cloud infrastructure as a service system, according to at least one embodiment.

FIG. 14 is a block diagram 1400 illustrating an example pattern of an IaaS architecture, according to at least one embodiment. Service operators 1402 can be communicatively coupled to a secure host tenancy 1404 that can include a virtual cloud network (VCN) 1406 and a secure host subnet 1408. In some examples, the service operators 1402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1406 and/or the Internet.

The VCN 1406 can include a local peering gateway (LPG) 1410 that can be communicatively coupled to a secure shell (SSH) VCN 1412 via an LPG 1410 contained in the SSH VCN 1412. The SSH VCN 1412 can include an SSH subnet 1414, and the SSH VCN 1412 can be communicatively coupled to a control plane VCN 1416 via the LPG 1410 contained in the control plane VCN 1416. Also, the SSH VCN 1412 can be communicatively coupled to a data plane VCN 1418 via an LPG 1410. The control plane VCN 1416 and the data plane VCN 1418 can be contained in a service tenancy 1419 that can be owned and/or operated by the IaaS provider.

The control plane VCN 1416 can include a control plane demilitarized zone (DMZ) tier 1420 that acts as a perimeter network (e.g., portions of a corporate network between the corporate intranet and external networks). The DMZ-based servers may have restricted responsibilities and help keep breaches contained. Additionally, the DMZ tier 1420 can include one or more load balancer (LB) subnet(s) 1422, a control plane app tier 1424 that can include app subnet(s) 1426, a control plane data tier 1428 that can include database (DB) subnet(s) 1430 (e.g., frontend DB subnet(s) and/or backend DB subnet(s)). The LB subnet(s) 1422 contained in the control plane DMZ tier 1420 can be communicatively coupled to the app subnet(s) 1426 contained in the control plane app tier 1424 and an Internet gateway 1434 that can be contained in the control plane VCN 1416, and the app subnet(s) 1426 can be communicatively coupled to the DB subnet(s) 1430 contained in the control plane data tier 1428 and a service gateway 1436 and a network address translation (NAT) gateway 1438. The control plane VCN 1416 can include the service gateway 1436 and the NAT gateway 1438.

The control plane VCN 1416 can include a data plane mirror app tier 1440 that can include app subnet(s) 1426. The app subnet(s) 1426 contained in the data plane mirror app tier 1440 can include a virtual network interface controller (VNIC) 1442 that can execute a compute instance 1444. The compute instance 1444 can communicatively couple the app subnet(s) 1426 of the data plane mirror app tier 1440 to app subnet(s) 1426 that can be contained in a data plane app tier 1446.

The data plane VCN 1418 can include the data plane app tier 1446, a data plane DMZ tier 1448, and a data plane data tier 1450. The data plane DMZ tier 1448 can include LB subnet(s) 1422 that can be communicatively coupled to the app subnet(s) 1426 of the data plane app tier 1446 and the Internet gateway 1434 of the data plane VCN 1418. The app subnet(s) 1426 can be communicatively coupled to the service gateway 1436 of the data plane VCN 1418 and the NAT gateway 1438 of the data plane VCN 1418. The data plane data tier 1450 can also include the DB subnet(s) 1430 that can be communicatively coupled to the app subnet(s) 1426 of the data plane app tier 1446.

The Internet gateway 1434 of the control plane VCN 1416 and of the data plane VCN 1418 can be communicatively coupled to a metadata management service 1452 that can be communicatively coupled to public Internet 1454. Public Internet 1454 can be communicatively coupled to the NAT gateway 1438 of the control plane VCN 1416 and of the data plane VCN 1418. The service gateway 1436 of the control plane VCN 1416 and of the data plane VCN 1418 can be communicatively couple to cloud services 1456.

In some examples, the service gateway 1436 of the control plane VCN 1416 or of the data plane VCN 1418 can make application programming interface (API) calls to cloud services 1456 without going through public Internet 1454. The API calls to cloud services 1456 from the service gateway 1436 can be one-way: the service gateway 1436 can make API calls to cloud services 1456, and cloud services 1456 can send requested data to the service gateway 1436. But, cloud services 1456 may not initiate API calls to the service gateway 1436.

In some examples, the secure host tenancy 1404 can be directly connected to the service tenancy 1419, which may be otherwise isolated. The secure host subnet 1408 can communicate with the SSH subnet 1414 through an LPG 1410 that may enable two-way communication over an otherwise isolated system. Connecting the secure host subnet 1408 to the SSH subnet 1414 may give the secure host subnet 1408 access to other entities within the service tenancy 1419.

The control plane VCN 1416 may allow users of the service tenancy 1419 to set up or otherwise provision desired resources. Desired resources provisioned in the control plane VCN 1416 may be deployed or otherwise used in the data plane VCN 1418. In some examples, the control plane VCN 1416 can be isolated from the data plane VCN 1418, and the data plane mirror app tier 1440 of the control plane VCN 1416 can communicate with the data plane app tier 1446 of the data plane VCN 1418 via VNICs 1442 that can be contained in the data plane mirror app tier 1440 and the data plane app tier 1446.

In some examples, users of the system, or customers, can make requests, for example create, read, update, or delete (CRUD) operations, through public Internet 1454 that can communicate the requests to the metadata management service 1452. The metadata management service 1452 can communicate the request to the control plane VCN 1416 through the Internet gateway 1434. The request can be received by the LB subnet(s) 1422 contained in the control plane DMZ tier 1420. The LB subnet(s) 1422 may determine that the request is valid, and in response to this determination, the LB subnet(s) 1422 can transmit the request to app subnet(s) 1426 contained in the control plane app tier 1424. If the request is validated and requires a call to public Internet 1454, the call to public Internet 1454 may be transmitted to the NAT gateway 1438 that can make the call to public Internet 1454. Metadata that may be desired to be stored by the request can be stored in the DB subnet(s) 1430.

In some examples, the data plane mirror app tier 1440 can facilitate direct communication between the control plane VCN 1416 and the data plane VCN 1418. For example, changes, updates, or other suitable modifications to configuration may be desired to be applied to the resources contained in the data plane VCN 1418. Via a VNIC 1442, the control plane VCN 1416 can directly communicate with, and can thereby execute the changes, updates, or other suitable modifications to configuration to, resources contained in the data plane VCN 1418.

In some embodiments, the control plane VCN 1416 and the data plane VCN 1418 can be contained in the service tenancy 1419. In this case, the user, or the customer, of the system may not own or operate either the control plane VCN 1416 or the data plane VCN 1418. Instead, the IaaS provider may own or operate the control plane VCN 1416 and the data plane VCN 1418, both of which may be contained in the service tenancy 1419. This embodiment can enable isolation of networks that may prevent users or customers from interacting with other users', or other customers', resources. Also, this embodiment may allow users or customers of the system to store databases privately without needing to rely on public Internet 1454, which may not have a desired level of threat prevention, for storage.

In other embodiments, the LB subnet(s) 1422 contained in the control plane VCN 1416 can be configured to receive a signal from the service gateway 1436. In this embodiment, the control plane VCN 1416 and the data plane VCN 1418 may be configured to be called by a customer of the IaaS provider without calling public Internet 1454. Customers of the IaaS provider may desire this embodiment since database(s) that the customers use may be controlled by the IaaS provider and may be stored on the service tenancy 1419, which may be isolated from public Internet 1454.

Figure 15:
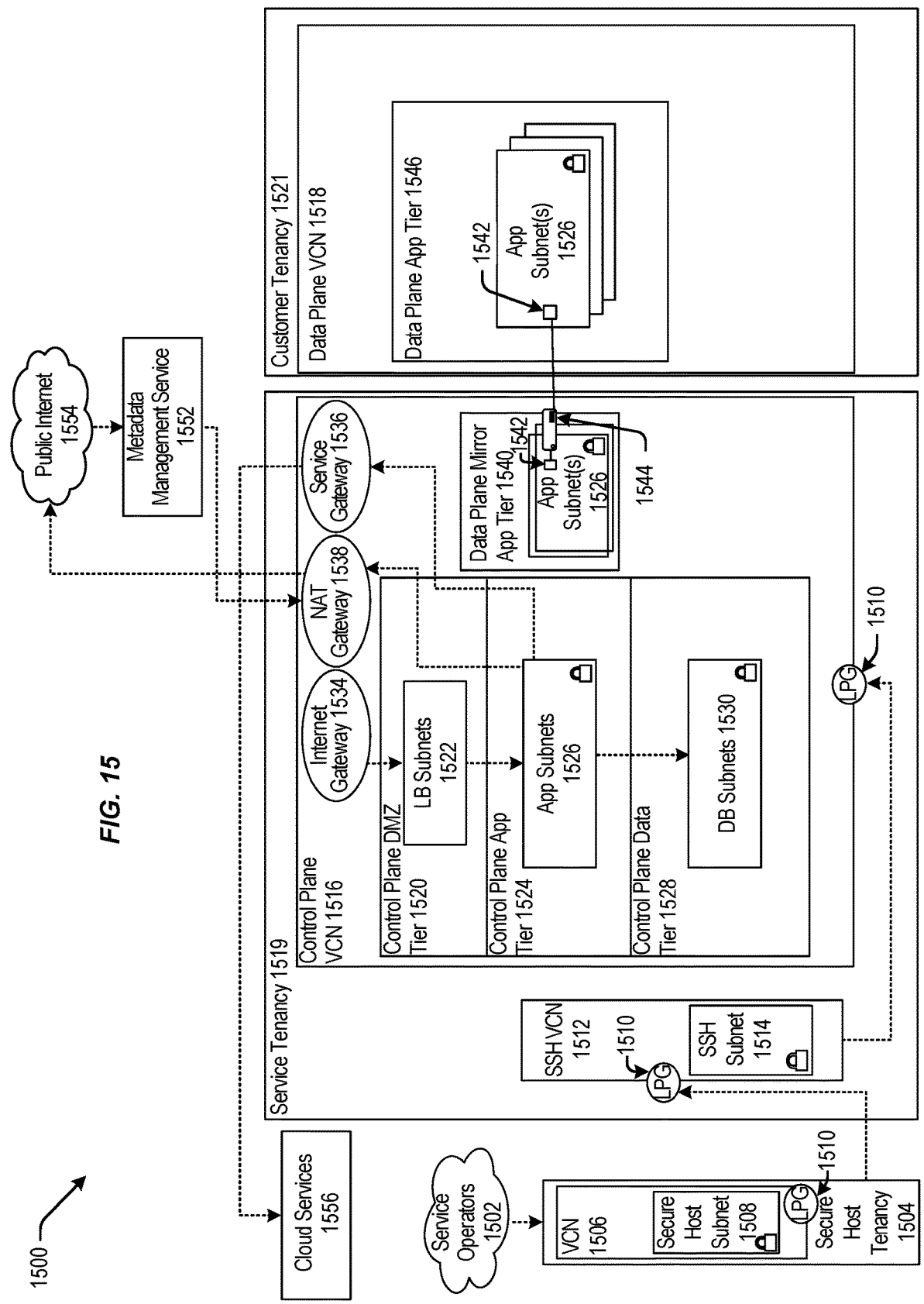
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1402 of FIG. 14) can be communicatively coupled to a secure host tenancy 1504 (e.g., the secure host tenancy 1404 of FIG. 14) that can include a virtual cloud network (VCN) 1506 (e.g., the VCN 1406 of FIG. 14) and a secure host subnet 1508 (e.g., the secure host subnet 1408 of FIG. 14). The VCN 1506 can include a local peering gateway (LPG) 1510 (e.g., the LPG 1410 of FIG. 14) that can be communicatively coupled to a secure shell (SSH) VCN 1512 (e.g., the SSH VCN 1412 of FIG. 14) via an LPG 1410 contained in the SSH VCN 1512. The SSH VCN 1512 can include an SSH subnet 1514 (e.g., the SSH subnet 1414 of FIG. 14), and the SSH VCN 1512 can be communicatively coupled to a control plane VCN 1516 (e.g., the control plane VCN 1416 of FIG. 14) via an LPG 1510 contained in the control plane VCN 1516. The control plane VCN 1516 can be contained in a service tenancy 1519 (e.g., the service tenancy 1419 of FIG. 14), and the data plane VCN 1518 (e.g., the data plane VCN 1418 of FIG. 14) can be contained in a customer tenancy 1521 that may be owned or operated by users, or customers, of the system.

The control plane VCN 1516 can include a control plane DMZ tier 1520 (e.g., the control plane DMZ tier 1420 of FIG. 14) that can include LB subnet(s) 1522 (e.g., LB subnet(s) 1422 of FIG. 14), a control plane app tier 1524 (e.g., the control plane app tier 1424 of FIG. 14) that can include app subnet(s) 1526 (e.g., app subnet(s) 1426 of FIG. 14), a control plane data tier 1528 (e.g., the control plane data tier 1428 of FIG. 14) that can include database (DB) subnet(s) 1530 (e.g., similar to DB subnet(s) 1430 of FIG. 14). The LB subnet(s) 1522 contained in the control plane DMZ tier 1520 can be communicatively coupled to the app subnet(s) 1526 contained in the control plane app tier 1524 and an Internet gateway 1534 (e.g., the Internet gateway 1434 of FIG. 14) that can be contained in the control plane VCN 1516, and the app subnet(s) 1526 can be communicatively coupled to the DB subnet(s) 1530 contained in the control plane data tier 1528 and a service gateway 1536 (e.g., the service gateway 1436 of FIG. 14) and a network address translation (NAT) gateway 1538 (e.g., the NAT gateway 1438 of FIG. 14). The control plane VCN 1516 can include the service gateway 1536 and the NAT gateway 1538.

The control plane VCN 1516 can include a data plane mirror app tier 1540 (e.g., the data plane mirror app tier 1440 of FIG. 14) that can include app subnet(s) 1526. The app subnet(s) 1526 contained in the data plane mirror app tier 1540 can include a virtual network interface controller (VNIC) 1542 (e.g., the VNIC of 1442) that can execute a compute instance 1544 (e.g., similar to the compute instance 1444 of FIG. 14). The compute instance 1544 can facilitate communication between the app subnet(s) 1526 of the data plane mirror app tier 1540 and the app subnet(s) 1526 that can be contained in a data plane app tier 1546 (e.g., the data plane app tier 1446 of FIG. 14) via the VNIC 1542 contained in the data plane mirror app tier 1540 and the VNIC 1542 contained in the data plane app tier 1546.

The Internet gateway 1534 contained in the control plane VCN 1516 can be communicatively coupled to a metadata management service 1552 (e.g., the metadata management service 1452 of FIG. 14) that can be communicatively coupled to public Internet 1554 (e.g., public Internet 1454 of FIG. 14). Public Internet 1554 can be communicatively coupled to the NAT gateway 1538 contained in the control plane VCN 1516. The service gateway 1536 contained in the control plane VCN 1516 can be communicatively couple to cloud services 1556 (e.g., cloud services 1456 of FIG. 14).

In some examples, the data plane VCN 1518 can be contained in the customer tenancy 1521. In this case, the IaaS provider may provide the control plane VCN 1516 for each customer, and the IaaS provider may, for each customer, set up a unique compute instance 1544 that is contained in the service tenancy 1519. Each compute instance 1544 may allow communication between the control plane VCN 1516, contained in the service tenancy 1519, and the data plane VCN 1518 that is contained in the customer tenancy 1521. The compute instance 1544 may allow resources, which are provisioned in the control plane VCN 1516 that is contained in the service tenancy 1519, to be deployed or otherwise used in the data plane VCN 1518 that is contained in the customer tenancy 1521.

In other examples, the customer of the IaaS provider may have databases that live in the customer tenancy 1521. In this example, the control plane VCN 1516 can include the data plane mirror app tier 1540 that can include app subnet(s) 1526. The data plane mirror app tier 1540 can reside in the data plane VCN 1518, but the data plane mirror app tier 1540 may not live in the data plane VCN 1518. That is, the data plane mirror app tier 1540 may have access to the customer tenancy 1521, but the data plane mirror app tier 1540 may not exist in the data plane VCN 1518 or be owned or operated by the customer of the IaaS provider. The data plane mirror app tier 1540 may be configured to make calls to the data plane VCN 1518 but may not be configured to make calls to any entity contained in the control plane VCN 1516. The customer may desire to deploy or otherwise use resources in the data plane VCN 1518 that are provisioned in the control plane VCN 1516, and the data plane mirror app tier 1540 can facilitate the desired deployment, or other usage of resources, of the customer.

In some embodiments, the customer of the IaaS provider can apply filters to the data plane VCN 1518. In this embodiment, the customer can determine what the data plane VCN 1518 can access, and the customer may restrict access to public Internet 1554 from the data plane VCN 1518. The IaaS provider may not be able to apply filters or otherwise control access of the data plane VCN 1518 to any outside networks or databases. Applying filters and controls by the customer onto the data plane VCN 1518, contained in the customer tenancy 1521, can help isolate the data plane VCN 1518 from other customers and from public Internet 1554.

In some embodiments, cloud services 1556 can be called by the service gateway 1536 to access services that may not exist on public Internet 1554, on the control plane VCN 1516, or on the data plane VCN 1518. The connection between cloud services 1556 and the control plane VCN 1516 or the data plane VCN 1518 may not be live or continuous. Cloud services 1556 may exist on a different network owned or operated by the IaaS provider. Cloud services 1556 may be configured to receive calls from the service gateway 1536 and may be configured to not receive calls from public Internet 1554. Some cloud services 1556 may be isolated from other cloud services 1556, and the control plane VCN 1516 may be isolated from cloud services 1556 that may not be in the same region as the control plane VCN 1516. For example, the control plane VCN 1516 may be located in "Region 1," and cloud service "Deployment 14," may be located in Region 1 and in "Region 2." If a call to Deployment 14 is made by the service gateway 1536 contained in the control plane VCN 1516 located in Region 1, the call may be transmitted to Deployment 14 in Region 1. In this example, the control plane VCN 1516, or Deployment 14 in Region 1, may not be communicatively coupled to, or otherwise in communication with, Deployment 14 in Region 2.

Figure 16:
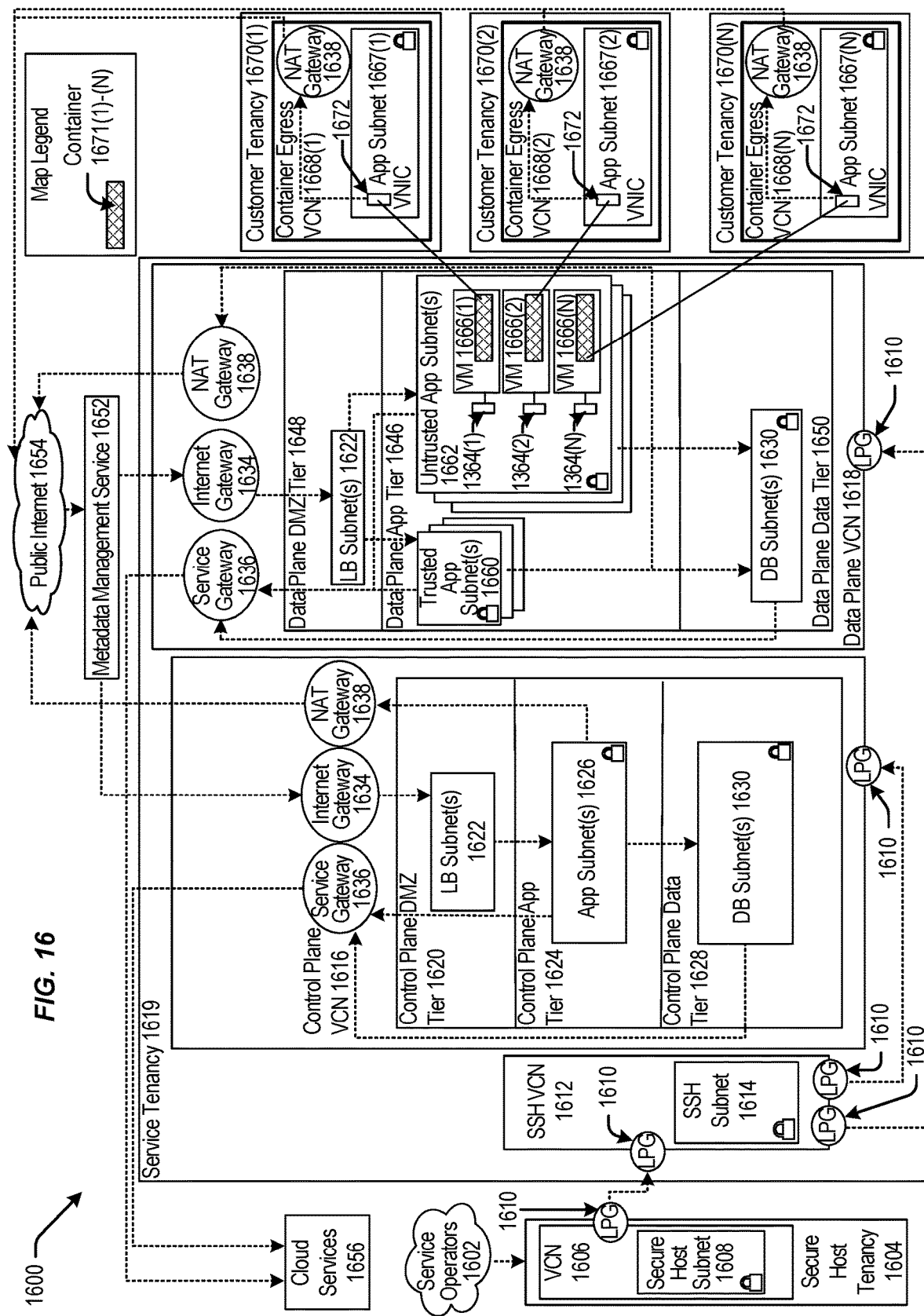
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1402 of FIG. 14) can be communicatively coupled to a secure host tenancy 1604 (e.g., the secure host tenancy 1404 of FIG. 14) that can include a virtual cloud network (VCN) 1606 (e.g., the VCN 1406 of FIG. 14) and a secure host subnet 1608 (e.g., the secure host subnet 1408 of FIG. 14). The VCN 1606 can include an LPG 1610 (e.g., the LPG 1410 of FIG. 14) that can be communicatively coupled to an SSH VCN 1612 (e.g., the SSH VCN 1412 of FIG. 14) via an LPG 1610 contained in the SSH VCN 1612. The SSH VCN 1612 can include an SSH subnet 1614 (e.g., the SSH subnet 1414 of FIG. 14), and the SSH VCN 1612 can be communicatively coupled to a control plane VCN 1616 (e.g., the control plane VCN 1416 of FIG. 14) via an LPG 1610 contained in the control plane VCN 1616 and to a data plane VCN 1618 (e.g., the data plane 1418 of FIG. 14) via an LPG 1610 contained in the data plane VCN 1618. The control plane VCN 1616 and the data plane VCN 1618 can be contained in a service tenancy 1619 (e.g., the service tenancy 1419 of FIG. 14).

The control plane VCN 1616 can include a control plane DMZ tier 1620 (e.g., the control plane DMZ tier 1420 of FIG. 14) that can include load balancer (LB) subnet(s) 1622 (e.g., LB subnet(s) 1422 of FIG. 14), a control plane app tier 1624 (e.g., the control plane app tier 1424 of FIG. 14) that can include app subnet(s) 1626 (e.g., similar to app subnet(s) 1426 of FIG. 14), a control plane data tier 1628 (e.g., the control plane data tier 1428 of FIG. 14) that can include DB subnet(s) 1630. The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1434 of FIG. 14) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 14) and a network address translation (NAT) gateway 1638 (e.g., the NAT gateway 1438 of FIG. 14). The control plane VCN 1616 can include the service gateway 1636 and the NAT gateway 1638.

The data plane VCN 1618 can include a data plane app tier 1646 (e.g., the data plane app tier 1446 of FIG. 14), a data plane DMZ tier 1648 (e.g., the data plane DMZ tier

1448 of FIG. 14), and a data plane data tier 1650 (e.g., the data plane data tier 1450 of FIG. 14). The data plane DMZ tier 1648 can include LB subnet(s) 1622 that can be communicatively coupled to trusted app subnet(s) 1660 and untrusted app subnet(s) 1662 of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include one or more primary VNICs 1664(1)-(N) that can be communicatively coupled to tenant virtual machines (VMs) 1666(1)-(N). Each tenant VM 1666(1)-(N) can be communicatively coupled to a respective app subnet 1667(1)-(N) that can be contained in respective container egress VCNs 1668(1)-(N) that can be contained in respective customer tenancies 1670(1)-(N). Respective secondary VNICs 1672(1)-(N) can facilitate communication between the untrusted app subnet(s) 1662 contained in the data plane VCN 1618 and the app subnet contained in the container egress VCNs 1668(1)-(N). Each container egress VCNs 1668(1)-(N) can include a NAT gateway 1638 that can be communicatively coupled to public Internet 1654 (e.g., public Internet 1454 of FIG. 14).

The Internet gateway 1634 contained in the control plane VCN 1616 and contained in the data plane VCN 1618 can be communicatively coupled to a metadata management service 1652 (e.g., the metadata management system 1452 of FIG. 14) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some embodiments, the data plane VCN 1618 can be integrated with customer tenancies 1670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1646. Code to run the function may be executed in the VMs 1666(1)-(N), and the code may not be configured to run anywhere else on the data plane VCN 1618. Each VM 1666(1)-(N) may be connected to one customer tenancy 1670. Respective containers 1671(1)-(N) contained in the VMs 1666(1)-(N) may be configured to run the code. In this case, there can be a dual isolation (e.g., the containers 1671(1)-(N) running code, where the containers 1671(1)-(N) may be contained in at least the VM 1666(1)-(N) that are contained in the untrusted app subnet(s) 1662), which may help prevent incorrect or otherwise undesirable code from damaging the network of the IaaS provider or from damaging a network of a different customer. The containers 1671(1)-(N) may be communicatively coupled to the customer tenancy 1670 and may be configured to transmit or receive data from the customer tenancy 1670. The containers 1671(1)-(N) may not be configured to transmit or receive data from any other entity in the data plane VCN 1618. Upon completion of running the code, the IaaS provider may kill or otherwise dispose of the containers 1671(1)-(N).

In some embodiments, the trusted app subnet(s) 1660 may run code that may be owned or operated by the IaaS provider. In this embodiment, the trusted app subnet(s) 1660 may be communicatively coupled to the DB subnet(s) 1630 and be configured to execute CRUD operations in the DB subnet(s) 1630. The untrusted app subnet(s) 1662 may be communicatively coupled to the DB subnet(s) 1630, but in this embodiment, the untrusted app subnet(s) may be configured to execute read operations in the DB subnet(s) 1630. The containers 1671(1)-(N) that can be contained in the VM 1666(1)-(N) of each customer and that may run code from the customer may not be communicatively coupled with the DB subnet(s) 1630.

In other embodiments, the control plane VCN 1616 and the data plane VCN 1618 may not be directly communicatively coupled. In this embodiment, there may be no direct communication between the control plane VCN 1616 and the data plane VCN 1618. However, communication can occur indirectly through at least one method. An LPG 1610 may be established by the IaaS provider that can facilitate communication between the control plane VCN 1616 and the data plane VCN 1618. In another example, the control plane VCN 1616 or the data plane VCN 1618 can make a call to cloud services 1656 via the service gateway 1636. For example, a call to cloud services 1656 from the control plane VCN 1616 can include a request for a service that can communicate with the data plane VCN 1618.

Figure 17:
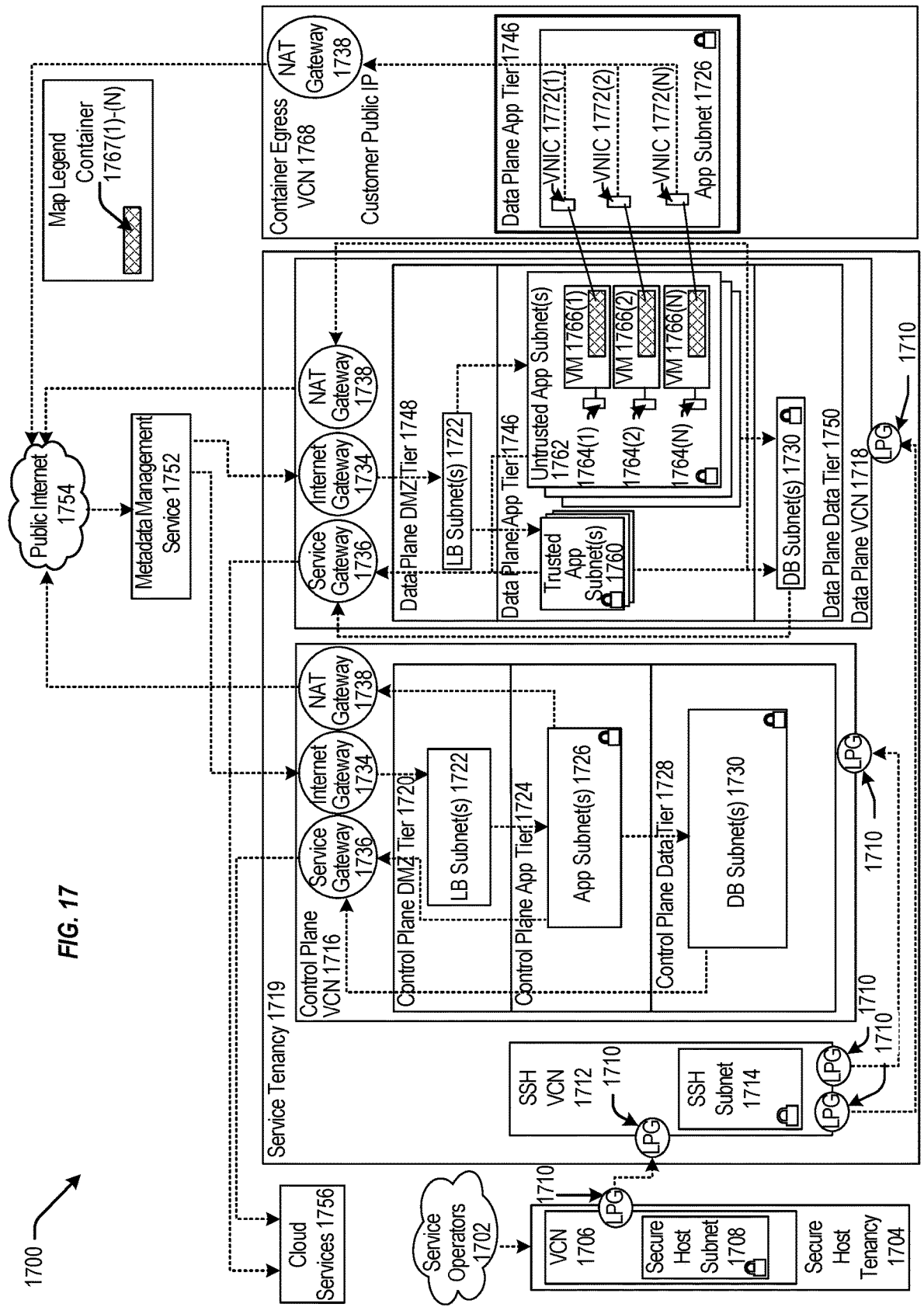
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1402 of FIG. 14) can be communicatively coupled to a secure host tenancy 1704 (e.g., the secure host tenancy 1404 of FIG. 14) that can include a virtual cloud network (VCN) 1706 (e.g., the VCN 1406 of FIG. 14) and a secure host subnet 1708 (e.g., the secure host subnet 1408 of FIG. 14). The VCN 1706 can include an LPG 1710 (e.g., the LPG 1410 of FIG. 14) that can be communicatively coupled to an SSH VCN 1712 (e.g., the SSH VCN 1412 of FIG. 14) via an LPG 1710 contained in the SSH VCN 1712. The SSH VCN 1712 can include an SSH subnet 1714 (e.g., the SSH subnet 1414 of FIG. 14), and the SSH VCN 1712 can be communicatively coupled to a control plane VCN 1716 (e.g., the control plane VCN 1416 of FIG. 14) via an LPG 1710 contained in the control plane VCN 1716 and to a data plane VCN 1718 (e.g., the data plane 1418 of FIG. 14) via an LPG 1710 contained in the data plane VCN 1718. The control plane VCN 1716 and the data plane VCN 1718 can be contained in a service tenancy 1719 (e.g., the service tenancy 1419 of FIG. 14).

The control plane VCN 1716 can include a control plane DMZ tier 1720 (e.g., the control plane DMZ tier 1420 of FIG. 14) that can include LB subnet(s) 1722 (e.g., LB subnet(s) 1422 of FIG. 14), a control plane app tier 1724 (e.g., the control plane app tier 1424 of FIG. 14) that can include app subnet(s) 1726 (e.g., app subnet(s) 1426 of FIG. 14), a control plane data tier 1728 (e.g., the control plane data tier 1428 of FIG. 14) that can include DB subnet(s) 1730 (e.g., DB subnet(s) 1630 of FIG. 16). The LB subnet(s) 1722 contained in the control plane DMZ tier 1720 can be communicatively coupled to the app subnet(s) 1726 contained in the control plane app tier 1724 and to an Internet gateway 1734 (e.g., the Internet gateway 1434 of FIG. 14) that can be contained in the control plane VCN 1716, and the app subnet(s) 1726 can be communicatively coupled to the DB subnet(s) 1730 contained in the control plane data tier 1728 and to a service gateway 1736 (e.g., the service gateway of FIG. 14) and a network address translation (NAT) gateway 1738 (e.g., the NAT gateway 1438 of FIG. 14). The control plane VCN 1716 can include the service gateway 1736 and the NAT gateway 1738.

The data plane VCN 1718 can include a data plane app tier 1746 (e.g., the data plane app tier 1446 of FIG. 14), a data plane DMZ tier 1748 (e.g., the data plane DMZ tier 1448 of FIG. 14), and a data plane data tier 1750 (e.g., the data plane data tier 1450 of FIG. 14). The data plane DMZ tier 1748 can include LB subnet(s) 1722 that can be communicatively coupled to trusted app subnet(s) 1760 (e.g., trusted app subnet(s) 1660 of FIG. 16) and untrusted app subnet(s) 1762 (e.g., untrusted app subnet(s) 1662 of FIG. 16) of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include primary VNICs 1764(1)-(N) that can be communicatively coupled to tenant virtual machines (VMs) 1766(1)-(N) residing within the untrusted app subnet(s) 1762. Each tenant VM 1766(1)-(N) can run code in a respective container 1767(1)-(N) and be communicatively coupled to an app subnet 1726 that can be contained in a data plane app tier 1746 that can be contained in a container egress VCN 1768. Respective secondary VNICs 1772(1)-(N) can facilitate communication between the untrusted app subnet(s) 1762 contained in the data plane VCN 1718 and the app subnet contained in the container egress VCN 1768. The container egress VCN can include a NAT gateway 1738 that can be communicatively coupled to public Internet 1754 (e.g., public Internet 1454 of FIG. 14).

The Internet gateway 1734 contained in the control plane VCN 1716 and contained in the data plane VCN 1718 can be communicatively coupled to a metadata management service 1752 (e.g., the metadata management system 1452 of FIG. 14) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some examples, the pattern illustrated by the architecture of block diagram 1700 of FIG. 17 may be considered an exception to the pattern illustrated by the architecture of block diagram 1600 of FIG. 16 and may be desirable for a customer of the IaaS provider if the IaaS provider cannot directly communicate with the customer (e.g., a disconnected region). The respective containers 1767(1)-(N) that are contained in the VMs 1766(1)-(N) for each customer can be accessed in real-time by the customer. The containers 1767(1)-(N) may be configured to make calls to respective secondary VNICs 1772(1)-(N) contained in app subnet(s) 1726 of the data plane app tier 1746 that can be contained in the container egress VCN 1768. The secondary VNICs 1772(1)-(N) can transmit the calls to the NAT gateway 1738 that may transmit the calls to public Internet 1754. In this example, the containers 1767(1)-(N) that can be accessed in real-time by the customer can be isolated from the control plane VCN 1716 and can be isolated from other entities contained in the data plane VCN 1718. The containers 1767(1)-(N) may also be isolated from resources from other customers.

In other examples, the customer can use the containers 1767(1)-(N) to call cloud services 1756. In this example, the customer may run code in the containers 1767(1)-(N) that requests a service from cloud services 1756. The containers 1767(1)-(N) can transmit this request to the secondary VNICs 1772(1)-(N) that can transmit the request to the NAT gateway that can transmit the request to public Internet 1754. Public Internet 1754 can transmit the request to LB subnet(s) 1722 contained in the control plane VCN 1716 via the Internet gateway 1734. In response to determining the request is valid, the LB subnet(s) can transmit the request to app subnet(s) 1726 that can transmit the request to cloud services 1756 via the service gateway 1736.

It should be appreciated that IaaS architectures 1400, 1500, 1600, 1700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 18:
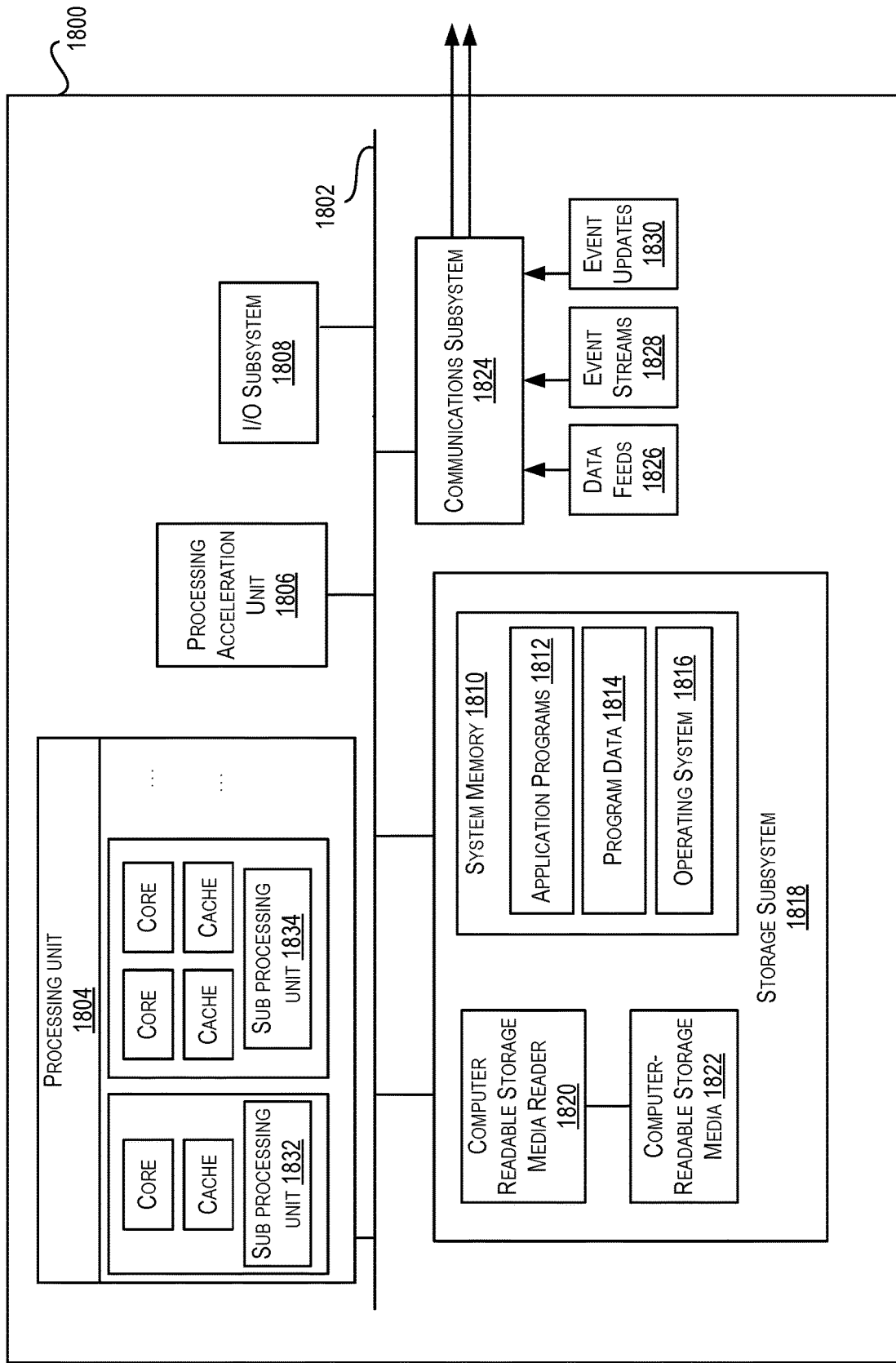
FIG. 18 is a block diagram illustrating an example computer system, according to at least one embodiment.

FIG. 18 illustrates an example computer system 1800, in which various embodiments may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1804 provide the functionality described above. Storage subsystem 1818 may also provide a repository for storing data used in accordance with the present disclosure.

As depicted in the example in FIG. 18, storage subsystem 1818 can include various components including a system memory 1810, computer-readable storage media 1822, and a computer readable storage media reader 1820. System memory 1810 may store program instructions that are loadable and executable by processing unit 1804. System memory 1810 may also store data that is used during the execution of the instructions and/or data that is generated during the execution of the program instructions. Various different kinds of programs may be loaded into system memory 1810 including but not limited to client applications, Web browsers, mid-tier applications, relational database management systems (RDBMS), virtual machines, containers, etc.

System memory 1810 may also store an operating system 1816. Examples of operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1800 executes one or more virtual machines, the virtual machines along with their guest operating systems (GOSs) may be loaded into system memory 1810 and executed by one or more processors or cores of processing unit 1804.

System memory 1810 can come in different configurations depending upon the type of computer system 1800. For example, system memory 1810 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 1810 may include a basic input/output system (BIOS) containing basic routines that help to transfer information between elements within computer system 1800, such as during start-up.

Computer-readable storage media 1822 may represent remote, local, fixed, and/or removable storage devices plus storage media for temporarily and/or more permanently containing, storing, computer-readable information for use by computer system 1800 including instructions executable by processing unit 1804 of computer system 1800.

Computer-readable storage media 1822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 1800.

Machine-readable instructions executable by one or more processors or cores of processing unit 1804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
managing, by a software agent executing at a smart network interface card configured at a host machine of a cloud computing environment, a persistent storage at the host machine that is accessible to the software agent at the smart network interface card, the persistent storage at the host machine being configured to store or provide data by request of the smart network interface card, the persistent storage being associated with a storage volume that is further associated with a remote storage device of the cloud computing environment, the remote storage device being accessible to the software agent via a network;
obtaining, by the software agent, configuration parameters that specify whether to utilize the persistent storage at the host machine for read operations or write operations;
receiving, by the software agent executing at the smart network interface card from the host machine, a data request being associated with an input/output operation comprising a read operation or a write operation;
responsive to identifying that the data request comprises the read operation or the write operation, determining, by the software agent executing at the smart network interface card and based at least in part on the configuration parameters, whether to utilize the persistent storage at the host machine or the remote storage device to fulfill the data request; and
responsive to determining that the persistent storage at the host machine is to be utilized to fulfill the data request, executing, by the software agent executing at the smart network interface card, one or more operations to cause the persistent storage to be utilized to fulfill the data request.

2. The method of claim 1, wherein the software agent executing at the smart network interface card executes as part of a non-volatile memory express (NVMe) controller of the smart network interface card, the NVMe controller being configured to utilize a NVMe protocol to process requests for accessing non-volatile remote storage accessible to the smart network interface card by a Peripheral Component Interconnect Express (PCIe) bus.

3. The method of claim 2, wherein determining that the persistent storage at the host machine is to be utilized to fulfill the data request comprises selecting the persistent storage from a pool of candidate storage comprising the persistent storage and the non-volatile remote storage, the non-volatile remote storage being hosted by a remote server.

4. The method of claim 1, wherein the persistent storage at the host machine and accessible to the software agent executing at the smart network interface card is a local storage device of the host machine.

5. The method of claim 1, wherein the persistent storage at the host machine and accessible to the software agent executing at the smart network interface card is local to the smart network interface card.

6. The method of claim 1, wherein the persistent storage at the host machine and accessible to the smart network interface card is configured to process over a threshold number of input/output operations per second.

7. The method of claim 1, wherein the configuration parameters indicate one or more policies that indicate a particular combination of input/output operations for which the persistent storage at the host machine is to be utilized by the software agent executing at the smart network interface card, the configuration parameters comprising a mode indicator indicating one of: a first mode corresponding to utilizing the persistent storage at the host machine for both read operations and write operations, a second mode indicating that the persistent storage at the host machine is not to be used for either the read operations or the write operations, or a third mode indicating that the persistent storage at the host machine is to be used for the write operations.

8. The method of claim 1, wherein the software agent implements a cache for the storage volume using the persistent storage, and wherein the cache may be activated or deactivated at run time.

9. The method of claim 8, further comprising persisting a payload of the data request previously stored in the persistent storage to the one or more remote storage devices based at least in part on a predefined frequency or schedule.

10. The method of claim 1, further comprising:
determining, by the software agent and based on network conditions of the network, whether to initiate a processing thread to purge data that is stored only at the persistent storage to the one or more remote storage devices; and
initiating, by the software agent, the processing thread for purging data that is stored only at the persistent storage to the one or more remote storage devices.

11. The method of claim 1, wherein the configuration parameters further comprise a storage threshold value for the persistent storage, wherein the method further comprises:
determining an amount of data of the storage volume that is stored only at the persistent storage; and
based on determining that the amount of data that is stored only at the persistent storage has breached the storage threshold value, initiating a processing thread for purging the data that is stored only at the persistent storage to the one or more remote storage devices.

12. A system, comprising:
memory configured to store instructions; and
one or more processors configured to execute the instructions to at least:
manage, by a software agent executing at a smart network interface card configured at a host machine of a cloud computing environment, a persistent storage at the host machine that is accessible to the software agent at the smart network interface card, the persistent storage being configured to store or provide data by request of the smart network interface card, the persistent storage being associated with a storage volume that is further associated with a remote storage device of the cloud computing environment, the remote storage device being accessible to the software agent via a network;
obtain, by the software agent, configuration parameters that specify whether to utilize the persistent storage at the host machine for read operations or write operations;
receive, by the software agent executing at the smart network interface card, from the host machine, a data request being associated with an input/output operation comprising a read operation or a write operation;
responsive to identifying that the data request comprises the input/output operation, determine, by the software agent executing at the smart network interface card and based at least in part on the configuration parameters, whether to utilize the persistent storage at the host machine or the remote storage device to fulfill the data request; and
responsive to determining that the persistent storage at the host machine is to be utilized to fulfill the data request, execute, by the software agent executing at the smart network interface card, one or more operations to cause the persistent storage to be utilized to fulfill the data request.

13. The system of claim 12, wherein the input/output operation comprises the read operation and wherein executing the one or more operations between the software agent executing at the smart network interface card and the persistent storage that is accessible to the software agent to fulfill the data request causes the system to:
determine, by the software agent executing at the smart network interface card and based at least in part on the data request, that a data payload corresponding to the read operation is stored in the persistent storage that is accessible to the software agent;
obtain, by the software agent executing at the smart network interface card from the persistent storage that is accessible to the software agent, the data payload corresponding to the read operation; and
provide, by the software agent executing at the smart network interface card, the data payload obtained from the persistent storage in response to the data request.

14. The system of claim 13, wherein the input/output operation comprises the read operation and wherein executing the one or more operations between the software agent executing at the smart network interface card and the persistent storage to fulfill the data request causes the system to:
determine, by the software agent executing at the smart network interface card and based at least in part on the data request, that the persistent storage is lacking the data payload corresponding to the read operation of the data request;
request, by the software agent executing at the smart network interface card from non-volatile remote storage, the data payload corresponding to the read operation;
receive, by the software agent executing at the smart network interface card, the data payload corresponding to the read operation; and
provide, by the software agent executing at the smart network interface card, the data payload obtained from the non-volatile remote storage in response to the data request.

15. The system of claim 14, wherein executing the instructions further causes the system to store in the persistent storage, by the software agent executing at the smart network interface card, the data payload corresponding to the read operation and received from the non-volatile remote storage.

16. The system of claim 15, wherein executing the instructions further causes the system to:
- receive, by the software agent executing at the smart network interface card, a second data request for the data payload;
- determine, by the software agent executing at the smart network interface card and based at least in part on the second data request, that the data payload is stored in the persistent storage that is accessible to the software agent; and
- obtain, by the software agent executing at the smart network interface card, the data payload from the persistent storage.

17. The system of claim 12, wherein the input/output operation comprises the write operation and wherein executing the one or more operations between the software agent and the persistent storage to fulfill the data request causes the system to:
- determine, by the software agent executing at the smart network interface card and based at least in part on the data request, a location in the persistent storage that is accessible to the software agent at which a data payload of the data request is to be stored; and
- in response to the data request, store, by the software agent executing at the smart network interface card, the data payload of the data request at the persistent storage that is accessible to the software agent.

18. The system of claim 12, wherein the persistent storage that is accessible to the software agent executing at the smart network interface card is associated with one or more policies for moving previously stored data from the persistent storage to non-volatile remote storage.

19. A non-transitory computer-readable medium comprising executable instructions that, when executed by one or more processors of a smart network interface card executing at a host machine of a cloud computing environment, causes the one or more processors of the smart network interface card to:
- manage a persistent storage at the host machine that is accessible to the one or more processors of the smart network interface card, the persistent storage being configured to store or provide data by request of the smart network interface card, the persistent storage being associated with a storage volume that is further associated with a remote storage device of the cloud computing environment, the remote storage device being accessible to the one or more processors via a network;
- obtain configuration parameters that specify whether to utilize the persistent storage at the host machine for read operations or write operations;
- receive, from the host machine, a data request being associated with an input/output operation comprising a read operation or a write operation;
- responsive to identifying that the data request comprises the input/output operation, determine, based at least in part on the configuration parameters whether to utilize the persistent storage at the host machine or the remote storage device to fulfill the data request; and
- responsive to determining that the persistent storage at the host machine is to be utilized to fulfill the data request, execute one or more operations to cause the persistent storage to be utilized to fulfill the data request.

20. The non-transitory computer-readable medium of claim 19, wherein executing the executable instructions further causes the one or more processors of the smart network interface card to:
- receive one or more configuration parameters that indicate at least a threshold that, when reached, causes data stored at the persistent storage to be written to a non-volatile remote storage and removed from the persistent storage; and
- execute additional operations to cause the data stored at the persistent storage to be written to the non-volatile remote storage and removed from the persistent storage according to the threshold.

21. The non-transitory computer-readable medium of claim 19, wherein the data request comprises the write operation, and wherein executing the executable instructions further causes the one or more processors of the smart network interface card to:
- write a data payload of the data request to the persistent storage at the host machine that is accessible to the smart network interface card;
- determine that a time period has elapsed;
- transmit the data payload to non-volatile remote storage for storage; and
- remove the data payload from the persistent storage at the host machine that is accessible to the smart network interface card.

22. The non-transitory computer-readable medium of claim 19, wherein the persistent storage that is accessible to the smart network interface card comprises at least one of: non-volatile random-access memory of the smart network interface card or a solid-state drive attached to the host machine, wherein the persistent storage that is accessible to the one or more processors is dedicated to storing data associated with one or more input/output operations received from the host machine.

* * * * *